(12) United States Patent
Osman et al.

(10) Patent No.: US 12,290,754 B2
(45) Date of Patent: May 6, 2025

(54) AUTOMATED ARTIFICIAL INTELLIGENCE (AI) PERSONAL ASSISTANT

(71) Applicant: Sony Interactive Entertainment Inc., Tokyo (JP)

(72) Inventors: Steven Osman, San Francisco, CA (US); Jeffrey R. Stafford, Redwood City, CA (US); Javier F. Rico, Pacifica, CA (US); Michael G. Taylor, San Mateo, CA (US); Todd S. Tokubo, Newark, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 119 days.

(21) Appl. No.: 17/131,048

(22) Filed: Dec. 22, 2020

(65) Prior Publication Data

US 2021/0106919 A1    Apr. 15, 2021

Related U.S. Application Data

(63) Continuation of application No. 16/268,384, filed on Feb. 5, 2019, now Pat. No. 10,870,057, which is a
(Continued)

(51) Int. Cl.
*A63F 13/67*    (2014.01)
*A63F 13/335*   (2014.01)
(Continued)

(52) U.S. Cl.
CPC .......... *A63F 13/67* (2014.09); *A63F 13/335* (2014.09); *A63F 13/5375* (2014.09);
(Continued)

(58) Field of Classification Search
CPC .. A63F 13/335; A63F 13/5375; A63F 13/795; A63F 13/798; A63F 13/85; G06N 5/04
See application file for complete search history.

(56) References Cited

U.S. PATENT DOCUMENTS 6,966,832 B2    11/2005   Leen et al.
7,452,273 B2    11/2008   Amaitis et al.
(Continued)

FOREIGN PATENT DOCUMENTS

CN    101160158 A    4/2008
CN    101313322 A    11/2008
(Continued)

OTHER PUBLICATIONS

CN Application No. 202210669703.8 Office Action, Dated Jun. 8, 2023, Total 7 pages.
(Continued)

*Primary Examiner* — Reginald A Renwick
(74) *Attorney, Agent, or Firm* — Fish & Richardson P.C.

(57) ABSTRACT

A method for assisting game play. The method includes monitoring game play of the user playing a gaming application, wherein the user has a defined task to accomplish, wherein the task is associated with a task type. The method includes determining a task type proficiency rule for the task type based on results of a plurality of players taking on a plurality of tasks having the task type. The method includes determining a player proficiency score for accomplishing the task based on the task type proficiency rule. The method includes determining a user predictive rate of success in accomplishing the task based on the player proficiency score, the task type proficiency rule, and the task. The method includes determining a recommendation for the user based on the user predictive rate of success.

20 Claims, 9 Drawing Sheets

Related U.S. Application Data continuation of application No. 15/467,557, filed on Mar. 23, 2017, now Pat. No. 10,195,531.

(60) Provisional application No. 62/357,248, filed on Jun. 30, 2016.

(51) Int. Cl.
    *A63F 13/5375*      (2014.01)
    *A63F 13/795*      (2014.01)
    *A63F 13/798*      (2014.01)
    *A63F 13/85*      (2014.01)
    *G06N 5/04*      (2023.01)

(52) U.S. Cl.
CPC .......... *A63F 13/795* (2014.09); *A63F 13/798* (2014.09); *A63F 13/85* (2014.09); *G06N 5/04* (2013.01); *A63F 2300/407* (2013.01); *A63F 2300/535* (2013.01); *A63F 2300/6027* (2013.01)

(56) References Cited

U.S. PATENT DOCUMENTS

| | | | |
|---|---|---|---|
| 9,108,108 | B2 | 8/2015 | Zalewski et al. |
| 9,443,192 | B1 | 9/2016 | Cosic |
| 9,498,704 | B1 | 11/2016 | Cohen et al. |
| 9,662,584 | B2 | 5/2017 | Youm et al. |
| 10,112,113 | B2 | 10/2018 | Krishnamurthy |
| 10,828,566 | B2 | 11/2020 | Krishnamurthy |
| 10,828,567 | B2 | 11/2020 | Krishnamurthy |
| 11,420,124 | B2 | 8/2022 | Krishnamurthy |
| 2003/0045359 | A1 | 3/2003 | Leen et al. |
| 2004/0097287 | A1 | 5/2004 | Postrel |
| 2005/0118996 | A1 | 6/2005 | Lee et al. |
| 2006/0247055 | A1 | 11/2006 | O'Kelley et al. |
| 2007/0112706 | A1 | 5/2007 | Herbrich et al. |
| 2008/0220854 | A1 | 9/2008 | Midgley et al. |
| 2013/0005452 | A1 | 1/2013 | Chatani |
| 2013/0084985 | A1 | 4/2013 | Green et al. |
| 2013/0316779 | A1 | 11/2013 | Vogel |
| 2013/0316836 | A1 | 11/2013 | Vogel et al. |
| 2015/0231502 | A1 | 8/2015 | Allen et al. |
| 2016/0067612 | A1 | 3/2016 | Ntoulas et al. |
| 2016/0071355 | A1 | 3/2016 | Morrison et al. |
| 2016/0166935 | A1 | 6/2016 | Condrey et al. |
| 2016/0279522 | A1 | 9/2016 | De Plater et al. |
| 2017/0282063 | A1 | 10/2017 | Krishnamurthy |
| 2019/0358545 | A1 | 11/2019 | Aghdaie et al. |

FOREIGN PATENT DOCUMENTS

| | | |
|---|---|---|
| CN | 105302963 A | 2/2016 |
| CN | 105426969 A | 3/2016 |
| CN | 106406912 A | 2/2017 |
| JP | 2006-341086 A | 12/2006 |
| JP | 2007-069005 A | 3/2007 |
| JP | 2010-201035 A | 9/2010 |
| JP | 2011-218102 A | 11/2011 |
| JP | 2012-205749 A | 10/2012 |

OTHER PUBLICATIONS

CN Application No. 202210669703.8 Office Action, Dated Mar. 28, 2023, Total 5 pages.

Bogdanovic et al., "Deep Apprenticeship Learning for Playing Video Games," Learning for General Competency in Video Games: Papers from the 2015 AAAI Workshop, 2015, 7-9.

International Preliminary Report on Patentability in International Appln. No. PCT/US2017/029864, mailed on Jan. 1, 2019, 10 pages.

International Search Report and Written Opinion PCT/US2017/029864, mailed on Aug. 14, 2017, 17 pages.

Masato, "Research on game AI that automatically acquires human-like behavior," Thesis for the degree of Doctor of Engineering, Kwansei Gakuin University, Jun. 18, 2016, 2 pages (abstract only).

Min et al., "Deep Learning-Based Goal Recognition in Open-Ended Digital Games," Department of Computer Science, North Carolina State University, Raleigh, NC, 2014, 37-43.

Mnih et al., "Human-level control through deep reinforcement learning," Nature, Feb. 26, 2015, 518(7540):529-533.

Mnih et al., "Playing Atari with Deep Reinforcement Learning," DeepMind Technologies, Dec. 2013, 9 pages.

Vice.com [online], "This Deep Learning Algorithm Can Predict Your Next Move in a Video Game," Sep. 9, 2014, retrieved on Jan. 21, 2025, retrieved from URL<https://www.vice.com/en/article/this-deep-learning-algorithm-can-predict-your-next-move-in-a-video-game/>, 11 pages.

Wired.com [online], "In Forza Horizon 2, Computers Finally Drive as Crazy as Humans," Sep. 25, 2014, retrieved on Jan. 21, 2025, retrieved from URL<https://www.wired.com/2014/09/forza-horizon-2-drivatars/>, 15 pages.

Yusuke et al., "Imitating the Behavior of Human Players in Action Games," Information Processing Society of Japan, Mar. 5, 2007, 2007(2): 1-8 (abstract only).

AUTOMATED ARTIFICIAL INTELLIGENCE (AI) PERSONAL ASSISTANT

CLAIM OF PRIORITY

The present application is a continuation of and claims priority to and the benefit of patent application Ser. No. 16/268,384, filed on Feb. 5, 2019, entitled "AUTOMATED ARTIFICIAL INTELLIGENCE (AI) PERSONAL ASSISTANT"; which is a continuation of and claims priority to and the benefit of patent application Ser. No. 15/467,557, filed on Mar. 23, 2017, entitled "AUTOMATED ARTIFICIAL INTELLIGENCE (AI) PERSONAL ASSISTANT"; which claims priority to and the benefit of the commonly owned, provisional patent application, U.S. Ser. No. 62/357,248, entitled "AUTOMATED ARTIFICIAL INTELLIGENCE (AI) PERSONAL ASSISTANT," with filing date of Jun. 30, 2016, all of which are herein incorporated by reference in their entireties.

RELATED APPLICATIONS

This application is related to commonly assigned, co-pending U.S. patent application Ser. No. 15/085,899, entitled "PERSONALIZED DATA DRIVEN GAME TRAINING SYSTEM," filed on Mar. 30, 2016, the disclosure of which is hereby incorporated by reference in its entirety.

TECHNICAL FIELD

The present disclosure is related to video games. Among other things, this disclosure describes methods and systems for monitoring game play of users playing a gaming application, learn the various paths available within the gaming application and how those users play along those paths, and provide assistance to a user based on past performance of the user, current performance of the user, and historical performance of other users playing the gaming application.

SUMMARY

Embodiments of the present disclosure relate to systems and methods for providing gaming assistance to a user playing a gaming application based on the proficiency of the user in comparison with game plays of other users playing the gaming application. User proficiency considers the performance of the user during a current game play, historical performance of the user of past game plays in association with multiple gaming applications in general or of a particular genre, playing style of the user in association with multiple gaming applications in general or of a particular genre. Still other embodiments of the present disclosure relate to systems and methods for providing gaming assistance to a team of members playing a multi-player gaming application based on a predictive model that determines probabilities of success for the team completing a set of tasks for various combinations of task assignments to team members based on the gaming profiles of the members, the set of tasks, and the current gaming environment. In particular, the gaming profiles define the playing proficiency of corresponding members and is based on performance of the user during a current game play, historical performance of the user of past game plays in association with multiple gaming applications in general or of a particular genre, playing style of the user in association with multiple gaming applications in general or of a particular genre.

In one embodiment, a method for assisting game play is disclosed. The method includes monitoring game play of a user playing a gaming application, wherein the user has a defined task to accomplish. The task may be associated with a task type that defines similarly configured tasks. The method also includes determining a task type proficiency rule based on results of a plurality of players taking on a plurality of tasks of the task type. The method includes determining a player proficiency score for accomplishing the task based on the task type proficiency rule. The player proficiency score considers the performance of the user during a current game play, historical performance of the user of past game plays in association with multiple gaming applications in general or of a particular genre, playing style of the user in association with multiple gaming applications in general or of a particular genre. The method includes determining a user predictive rate of success in accomplishing the task based on the player proficiency score, the task type proficiency rule, and the task. In some embodiments, the gaming environment is also considered. The method includes determining a recommendation for the user based on the user predictive rate of success.

In another embodiment, a method for providing gaming assistance is disclosed. The method includes monitoring a plurality of game plays of a plurality of players playing a plurality of gaming applications. The plurality of game plays includes a plurality of tasks to accomplish, wherein the plurality of tasks is associated with a plurality of task types. The method includes registering a plurality of team members of a team. The method includes determining a plurality of ratings for the plurality of team members in association with the plurality of task types. This may include accessing user profiles for the team members to access gaming proficiency ratings. The method includes for a plurality of combinations of task assignments from a set of related tasks, determining a plurality of predictive rates of success for the team in accomplishing the set of tasks based on the plurality of ratings, the set of tasks, and current conditions of a gaming environment of the gaming application. The method includes assigning tasks in the set of related tasks to the plurality of team members such that a predictive rate of success for the team in accomplishing the set of tasks is highest.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1A:
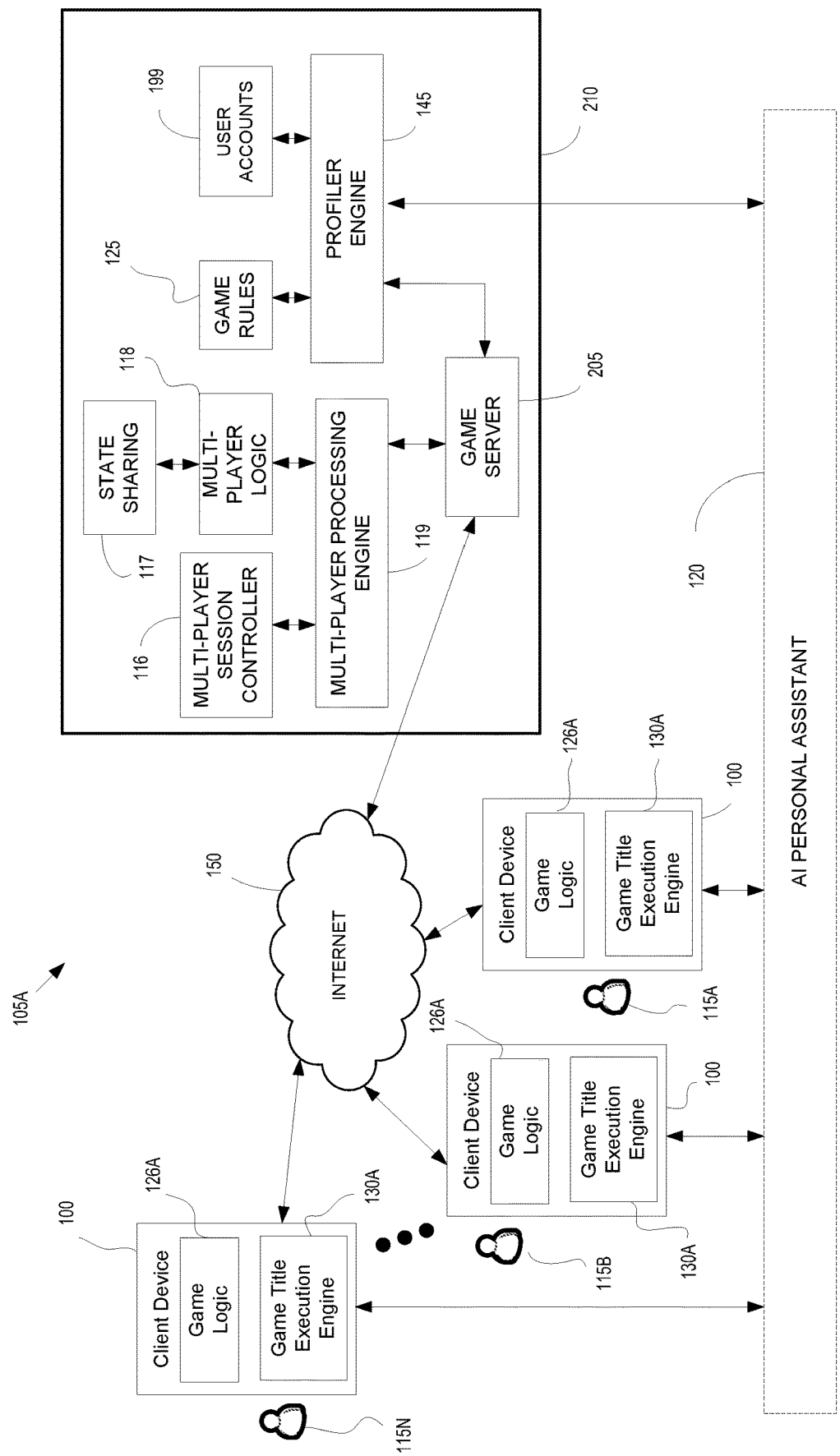
FIG. 1A illustrates a system providing personal assistance to users playing a gaming application that is executed locally, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods providing for assistance to users playing a gaming application in a single player or multi-player configuration. In particular, input history of the game play of a user and comparative histories of game plays of a plurality of players are used to rate the proficiency of a user when playing a gaming application, or when playing a genre of a gaming application, or when accomplishing tasks or subtasks within a gaming application. Further, the proficiency of team members of a team participating in a multi-player gaming application can be used to predict the probability of success for the team (e.g., winning a contest within a gaming application as implemented within a competitive gaming arena, completing a gaming application, and completing tasks and/or sub-tasks within a gaming application, etc.) that is based on compatibility of roles for team members (e.g., assigned tasks), and team construction (e.g., team members), given the conditions of the gaming environment. In that manner, the efficiency and/or proficiency of a user can be quantified for a user that is playing a gaming application, and further can be used to balance game play for the user (e.g., recommend the next task, sub-task, or action) or team members, and/or used to predict satisfaction and/or accomplishment of tasks, sub-tasks, actions within the game play of the user and/or team members. In particular, artificial intelligence can be used to continually examine the game play of multiple players playing a plurality of gaming application of various genres (e.g., varying game data) to learn the gaming style, skill, and habits of players in order to determine the predictive result of success for a single user or for team members of a team, or for a team when playing a gaming application in single-player mode or multi-player mode. In that manner, the predictive model can adapt to changes in player roles for one or more players in a single-player mode or multi-player mode, can adapt to changes in the context of the gaming environment, and can adapt to changes in performance changes of team members of a team. It is in this context that embodiments of the disclosure arise.

Accordingly, embodiments of the present disclosure provide for a better gaming experience for users participating in a gaming application because instead of struggling through hard sections of the gaming application, or quitting the gaming application, recommendations are provided in the form of gaming assistance to help guide the user. Also, other embodiments provide the above accomplishments and further provide for more efficient development of gaming applications through the use of analytics collected from game plays of users participating in a gaming application. The feedback provided to the game developers identify where users lose interest in a gaming application (e.g., through difficulty, boredom, etc.), which can be used by the developers to create new gaming applications that avoid those problems.

Throughout the specification, the term gaming application describes applications that allow interaction with a user. In one implementation, the gaming application includes a video game. Embodiments of the present disclosure provide gaming assistance to users participating in gaming applications. Other embodiments of the present disclosure provide assistance to users interacting with any type of application, such as word processing, computer aided design, etc.

Throughout the specification, the term user and player can be used interchangeably, and are meant to describe a person participating in a gaming application, or any other type of application. In some cases, embodiments of the present disclosure are described within the context of a "user" playing a gaming application within a game cloud system 210 and one or more "players" that are separately playing one or more gaming applications also within the game cloud system 210, wherein the user may or may not interact with the other players (e.g., single-player mode or multi-player mode).

With the above general understanding of the various embodiments, example details of the embodiments will now be described with reference to the various drawings.

FIG. 1A illustrates a system 105A providing personal assistance to users playing a gaming application that is executed locally to the corresponding user, and wherein back-end server support (e.g., accessible through game server 205) may provide for analysis of game play data of one or more users for purposes of providing gaming assistance to a corresponding user playing a gaming application, in accordance with one embodiment of the present disclosure.

As shown in FIG. 1A, a plurality of users 115 (e.g., user 115A, user 115B, ... user 115N) is playing a plurality of gaming applications, wherein each of the gaming applications are executed locally on a corresponding client device 100 (e.g., game console) of a corresponding user. Each of the client devices 100 may be configured similarly in that local execution of a corresponding gaming application is performed. For example, user 115A may be playing a first gaming application on a corresponding client device 100, wherein an instance of the first gaming application is executed by a corresponding game title execution engine 130A. Game logic 117A (e.g., executable code) implementing the first gaming application is stored on the corresponding client device 100, and is used to execute the first gaming application. For purposes of illustration, game logic 117A may be delivered to the corresponding client device 100 through a portable medium (e.g., flash drive, compact disk, etc.) or through a network (e.g., downloaded through the internet 150 from a gaming provider). In addition, user 115B is playing a second gaming application on a corresponding client device 100, wherein an instance of the second gaming application is executed by a corresponding game title execution engine 130A. The second gaming application may be identical to the first gaming application executing for user 115A or a different gaming application. Game logic 117B (e.g., executable code) implementing the second gaming application is stored on the corresponding client device 100 as previously described, and is used to execute the second gaming application. Further, user 115N is playing an Nth gaming application on a corresponding client device 100, wherein an instance of the Nth gaming application is executed by a corresponding game title execution engine 130A. The Nth gaming application may be identical to the first or second gaming application, or may be a completely different gaming application. Game logic 117C (e.g., executable code) implementing the third gaming application is stored on the corresponding client device 100 as previously described, and is used to execute the Nth gaming application.

For purposes of clarity and illustration, embodiments of the present disclosure may be described with reference to user 115A, wherein user 115A is representative of any of the plurality of users 115.

Client device 100 may receive input from various types of input devices, such as game controllers, tablet computers, keyboards, gestures captured by video cameras, mice touch pads, etc. Client device 100 can be any type of computing device having at least a memory and a processor module that is capable of connecting to the game server 205 over network 150. Some examples of client device 100 include a personal computer (PC), a game console, a home theater device, a general purpose computer, mobile computing device, a tablet, a phone, or any other type of computing devices that can interact with the game server 205 to provide back end functionality, such as gaming assistance or multi-player session management, etc.

Client device 100 of a corresponding user is configured for generating rendered images executed by the game title execution engine 130A that is executing locally, and for displaying the rendered images on a display. For example, the rendered images may be associated with an instance of the first gaming application executing on client device 100 of user 115A. In particular, a corresponding client device 100 is configured to interact with an instance of a corresponding gaming application as executed locally to implement a game play of a corresponding user, such as through input commands that are used to drive game play.

In one embodiment, client device 100 is operating in a single-player mode for a corresponding user that is playing a specific gaming application that is executed locally. Back-end server support via the game server 205 may provide gaming assistance to the user, such as through the profiler engine 145, as will be described more fully below.

In another embodiment, multiple client devices 100 are operating in a multi-player mode for corresponding users that are each playing a gaming application. In that case, back-end server support via the game server may provide multi-player functionality, such as through the multi-player processing engine 119. In particular, multi-player processing engine 119 is configured for controlling a multi-player gaming session for a particular gaming application. For example, multi-player processing engine 130 communicates with the multi-player session controller 116, which is configured to establish and maintain communication sessions with each of the users and/or players participating in the multi-player gaming session. In that manner, users in the session can communicate with each other as controlled by the multi-player session controller 116.

Further, multi-player processing engine 119 communicates with multi-player logic 118 in order to enable interaction between users within corresponding gaming environments of each user. In particular, state sharing module 117 is configured to manage states for each of the users in the multi-player gaming session. For example, state data may include game state data that defines the state of the game play (of a gaming application) for a corresponding user at a particular point. For example, game state data may include game characters, game objects, game object attributes, game attributes, game object state, graphic overlays, etc. In that manner, game state data allows for the generation of the gaming environment that exists at the corresponding point in the gaming application. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point. Game state data may be stored in database 140 of FIG. 1C and FIG. 2, and is accessible by state sharing module 117.

Further, state data may include user saved data that includes information that personalizes the video game for the corresponding player. This includes information associated with the user's character, so that the video game is rendered with a character that may be unique to that user (e.g., location, shape, look, clothing, weaponry, etc.). In that manner, the user saved data enables generation of a character for the game play of a corresponding user, wherein the character has a state that corresponds to the point in the gaming application experienced currently by a corresponding user. For example, user saved data may include the game difficulty selected by a corresponding user 115 when playing the game, game level, character attributes, character location, number of lives left, the total possible number of lives available, armor, trophy, time counter values, etc. User saved data may also include user profile data that identifies a corresponding user 115, for example. User saved data may be stored in database 140.

In that manner, the multi-player processing engine 119 using the state sharing data 117 and multi-player logic 118 is able to overlay/insert objects and characters into each of the gaming environments of the users participating in the multi-player gaming session. For example, a character of a first user is overlaid/inserted into the gaming environment of a second user. This allows for interaction between users in the multi-player gaming session via each of their respective gaming environments (e.g., as displayed on a screen).

In addition, back-end server support via the game server 205 may provide gaming assistance functionality, such as through the profiler engine 145 and AI personal assistant 120. In particular, profiler engine 145 in the game cloud system 210 is configured to provide gaming assistance to one or more users participating in a plurality of gaming applications, such as in single-player mode or multi-player mode. In general, artificial intelligence (AI) personal assistant 120 works in conjunction with profiling engine 145 to provide gaming assistance to one or more users. In one embodiment, AI personal assistant 120 is localized to a client device of a corresponding user as it provides the interface to the user for purposes of requesting and/or receiving personal assistance. In another embodiment, AI personal assistant is remote to the client device of the corresponding user. For example in one embodiment, assistance is provided to a single player playing a gaming application in a single-player mode when it is determined that the user is playing inefficiently and/or struggling in his or her game play. Assistance may also be provided to a player that is playing in a multi-player gaming session when requested or when it is determined that the player is in need of assistance. In another embodiment, assistance is provided to a team of members playing a gaming application in a multi-player mode to increase the probability of success that the team will accomplish a goal, such as completing a set of tasks or subtasks or actions, winning a contest against other teams in a competitive arena, completing a gaming application, etc.

In particular, AI personal assistant 120 is configured to work closely with a client device 100 of a corresponding user 115 to collect data regarding current and past game play of the corresponding user 115. Further, AI personal assistant 120 is configured to provide an interface with the corresponding user 115, such that assistance can be provided. For example, recommendations as generated by the profiler engine 145 may be provided through the interface, wherein the recommendations provide assistance during the current game play of a corresponding user 115. AI personal assistant 120 may be configured locally within client device 100 of a corresponding user 115, in one embodiment. Also, localized AI personal assistant 120 may be configured remote to client device 100 and independent of the game cloud system 210, in another embodiment. For example, AI personal assistant 120 may be accessed through network 150 (e.g., local area network, internet, etc.). In still another embodiment, AI personal assistant 120 may be configured remote to client 100 within the game cloud system 210. In that case, personal assistant 120 may be directly coupled with the profiler engine 145 within game cloud system 210.

As shown, profiler engine 145 is configured to provide back end server processing of gaming assistance. In particular, through the game cloud system 210, profiler engine 145 is able to collect and analyze game plays of a plurality of users playing a plurality of gaming applications, especially when the game cloud system 210 is executing instances of one or more gaming applications for the plurality of users 115. For example, profiler engine 145 is able to collect and analyze user data when a corresponding user 115A is playing any gaming application. Over time, profiler engine 145 is able to learn the playing style of the corresponding user 115A generally and/or for a particular genre of gaming applications. In addition, profiler engine 145 is able to rate a proficiency for the corresponding user 115A based on the user data, game rules 125 of one or more gaming applications, and game logic 126 of one or more gaming applications. In one embodiment, the proficiency is given for a particular gaming application, and is based on current game play of the user participating in the gaming application, past game play of the user participating in the gaming application, and may consider historical game play of the user participating in gaming applications of the same genre (e.g., playing style). In another embodiment, the proficiency is given for a genre of gaming applications, and is based on game play of the user participating in the gaming application, and may consider historical game play of the user participating in gaming applications of the same genre (e.g., playing style). In still another embodiment, the proficiency is given for gaming applications of one or more genres, and is based on game play of the user participating in the gaming application, and may consider historical game play of the user participating in gaming applications of the same genre (e.g., playing style). The proficiency rating of each of the plurality of users 115 is included in a corresponding gaming profile that is stored in the user accounts 199 database.

As such, the profiler engine 145 is able to rate a proficiency of a corresponding user and build a gaming profile for each of the plurality of users 115 based on game plays of the corresponding user, and in comparison to other users proficiencies and gaming profiles. As more data is collected from game plays of multiple users, the profiler engine 145 is able to learn (e.g., by applying deep learning or artificial intelligence techniques) how a particular gaming application should be played (generally, or within the context of a given level, sub-level, or given problem), or is being played by successful users, and/or other unsuccessful users (e.g., learning from mistakes). The way a gaming application should be played as learned by the profiler engine 145 will evolve over time, as more data is collected on game plays of users playing that gaming application. In that manner, recommendations can be made to a single user 115A that is playing the gaming application, especially when it is detected that the user 115A is stuck in the game play, or playing inefficiently in his or her game play. Furthermore, user proficiency ratings can be used to predict successful completion of a goal for a team of members. Recommendations may be made to assign tasks in a manner that maximizes the probability of successfully completing the team goal, and is based on the proficiency ratings of each team member, the tasks involved, and possibly the gaming environment.

Figure 1B:
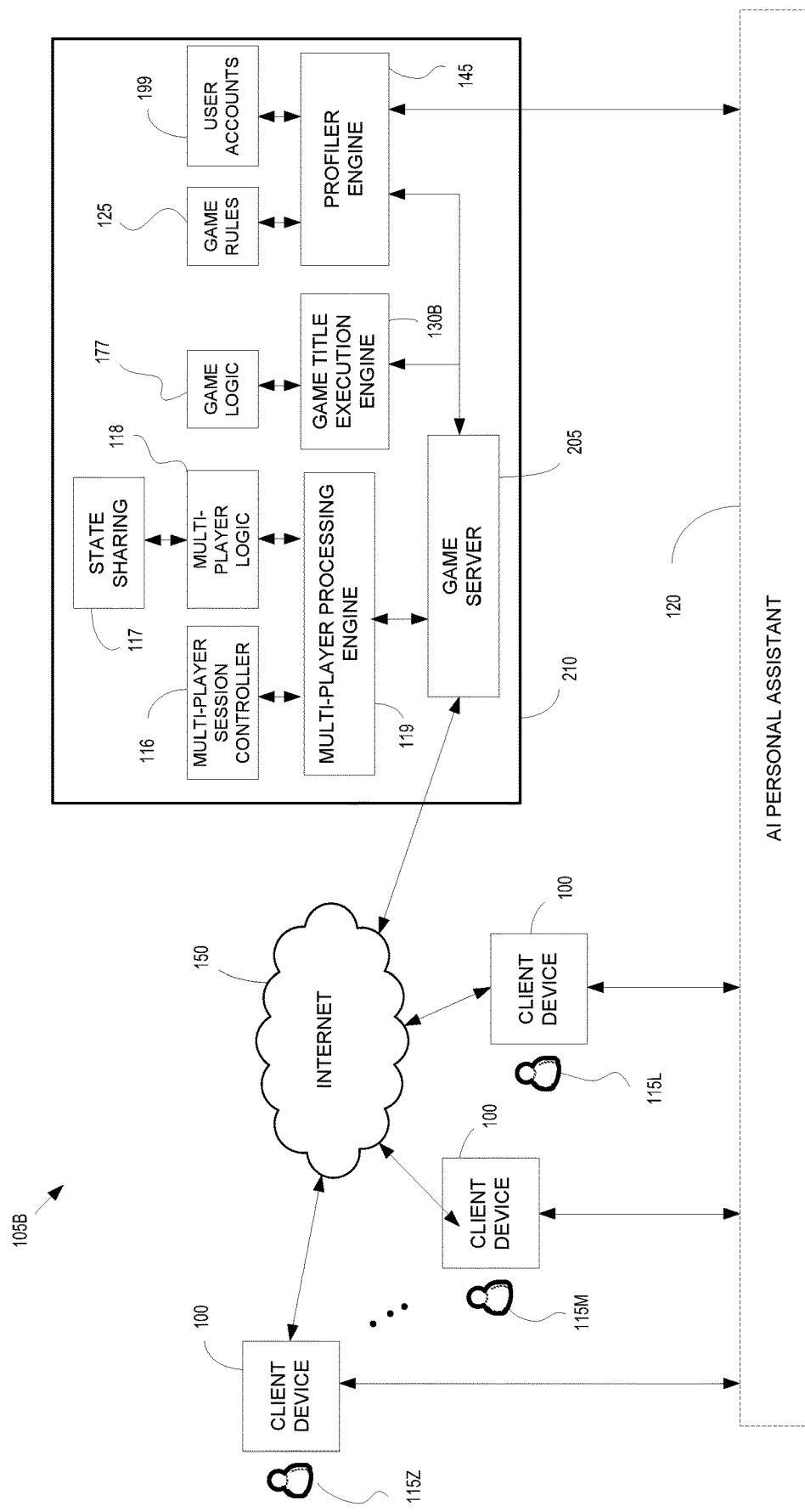
FIG. 1B illustrates a system providing personal assistance to users playing a gaming application as executed over a cloud game network, in accordance with one embodiment of the present disclosure.

FIG. 1B illustrates a system providing personal assistance to users playing a gaming application as executed over a cloud game network, in accordance with one embodiment of the present disclosure. In some embodiments, the cloud game network may be a game cloud system 210 that includes a plurality of virtual machines (VMs) running on a hypervisor of a host machine, with one or more virtual machines configured to execute a game processor module utilizing the hardware resources available to the hypervisor of the host.

As shown, the game cloud system 210 includes a game server 205 that provides access to a plurality of interactive video games or gaming applications. Game server 205 may be any type of server computing device available in the cloud, and may be configured as one or more virtual machines executing on one or more hosts. For example, game server 205 may manage a virtual machine supporting a game processor that instantiates an instance of a gaming application for a particular user 115A. As such, a plurality of game processors of game server 205 associated with a plurality of virtual machines is configured to execute multiple instances of the gaming application associated with game plays of the plurality of users 115.

As shown, the plurality of users 115 accesses the game cloud system 210 via network 150, wherein users 115 access network 150 via corresponding client devices 100. For example, a client device 100 of a corresponding user 115A is configured for requesting access to gaming applications over a network 150, such as the internet, and for rendering instances of gaming application (e.g., video game) executed by the game server 205 and delivered to a display device associated with the corresponding user 115A. For example, user 115A may be interacting through client device 100 with an instance of a gaming application executing on a corresponding game processor of game server 205. More particularly, an instance of the gaming application is executed by the game title execution engine 130B. Game logic (e.g., executable code) implementing a particular gaming application is stored and accessible through data store 140, and is used to execute the gaming application. In one embodiment, one or more game title execution engines 130B may be configured to support a plurality of instances of a plurality of gaming applications. As such, game title execution engine 130B is able to support a plurality of gaming applications using a plurality of game logic 177, as shown.

The client device 100 may receive input from various types of input devices, such as game controllers, tablet computers, keyboards, gestures captured by video cameras, mice, touch pads, etc. As previously described, client device 100 can be any type of computing device having at least a memory and a processor module that is capable of connecting to the game server 205 over network 150. Some examples of client device 100 include a personal computer (PC), a game console, a home theater device, a general purpose computer, mobile computing device, a tablet, a phone, or any other types of computing devices that can interact with the game server 205 to execute an instance of a gaming application.

Client device 100 of a user 115A is configured for receiving rendered images delivered by the game server 205, and for displaying the rendered images on a display. For example, the rendered images may be associated with an instance of a gaming application executing on game server 205 in association with a corresponding user 115A. In particular, a client device 100 is configured to interact with the instance of the gaming application associated with game play of user 115A, such as through input commands that are used to drive game play.

Profiler engine 145 in the game cloud system 210 is configured to provide gaming assistance to one or more users participating in one or more gaming applications in single-player mode or multi-player mode. In particular, artificial intelligence (AI) personal assistant 120 works in conjunction with profiler engine 145 to provide gaming assistance to one or more users. For example in one embodiment, assistance is provided to a single player playing a gaming application in a single-player mode or multi-player mode when it is determined that the user is playing inefficiently and/or struggling in his or her game play. In another embodiment, assistance is provided to a team of members playing a gaming application in a multi-player mode to increase the probability of success that the team will accomplish a goal, such as completing a set of tasks or subtasks or actions, winning a contest against other teams in a competitive arena, completing a gaming application, etc.

In particular, AI personal assistant 120 is configured to work closely with a client device 100 of a corresponding user 115A to collect data regarding current and past game play of a corresponding user 115A. Further, AI personal assistant 120 is configured to provide an interface with the corresponding user 115A, such that assistance can be provided. For example, recommendations as generated by the profiler engine 145 may be provided through the interface, wherein the recommendations provide assistance during the current game play of a corresponding user 115A. AI personal assistant 120 may be configured locally within client device 100 of a corresponding user 115A, in one embodiment. Also, localized AI personal assistant 120 may be configured remote to client device 100 independent of the game cloud system 210, in another embodiment. For example, AI personal assistant 120 may be accessed through network 150 (e.g., local area network, internet, etc.). In still another embodiment, localized AI personal assistant 120 may be configured remote to client 100 within the game cloud system 210. In that case, personal assistant 120 may be directly coupled with the profiler engine 145 within game cloud system 210.

As shown, profiler engine 145 is configured to provide back end server processing of gaming assistance. In particular, through the game cloud system 210, profiler engine 145 is able to collect and analyze game plays of a plurality of users 115 playing a plurality of gaming applications, especially when the game cloud system 210 is executing instances of the gaming applications for the users 115. For example, profiler engine 145 is able to collect and analyze user data when a corresponding user 115A is playing any gaming application. Over time, profiler engine 145 is able to learn the playing style of the corresponding user 115A generally and/or for a particular genre of gaming applications. In addition, profiler engine 145 is able to rate a proficiency for the corresponding user 115A based on the user data, game rules 125 of one or more gaming applications, and game logic 126 of one or more gaming applications. In one embodiment, the proficiency of user 115A is given for a particular gaming application, and is based on current game play of the user 115A participating in the gaming application, past game play of the user 115A participating in the gaming application, and may consider historical game play of the user 115A participating in gaming applications of the same genre (e.g., playing style). In another embodiment, the proficiency of user 115A is given for a genre of gaming applications, and is based on game play of the user 115A participating in the gaming application, and may consider historical game play of the user 115A participating in gaming applications of the same genre (e.g., playing style). In still another embodiment, the proficiency of 115A is given for gaming applications of one or more genres, and is based on game play of the user 115A participating in the gaming application, and may consider historical game play of the user 115A participating in gaming applications of one or more genres (e.g., evidence of an overall playing style). The proficiency rating of each of the plurality of users 115 is included in a corresponding gaming profile that is stored in the user accounts 199 database.

As such, the profiler engine 145 is able to rate a proficiency of a corresponding user 115A and build a gaming profile for user 115A based on game plays of the corresponding user 115A, and in comparison to other users proficiencies and gaming profiles. As more data is collected from game plays of multiple users, the profiler engine 145 is able to learn (e.g., by applying deep learning or artificial intelligence techniques) how a particular gaming application should be played (generally, or within the context of a given level, sub-level, or given problem), or is being played by successful users, and/or other unsuccessful users (e.g., learning from mistakes). The way a gaming application should be played as learned by the profiler engine 145 will evolve over time, as more data is collected on game plays of users playing that gaming application. In that manner, recommendations can be made to a single user 115A that is playing the gaming application, especially when it is detected that the user 115A is stuck in the game play, or playing inefficiently in his or her game play. Furthermore, user proficiency ratings can be used to predict successful completion of a goal for a team of members. Recommendations may be made to assign tasks in a manner that maximizes the probability of successfully completing the team goal, and is based on the proficiency ratings of each team member, the tasks involved, and possibly the gaming environment.

In another embodiment, multi-player processing engine 119, previously described, provides for controlling a multi-player gaming session for a gaming application. In particular, when the multi-player processing engine 119 is managing the multi-player gaming session, the multi-player session controller 116 is configured to establish and maintain communication sessions with each of the users and/or players in the multi-player session. In that manner, users in the session can communicate with each other as controlled by the multi-player session controller 116.

Further, multi-player processing engine 119 communicates with multi-player logic 118 in order to enable interaction between users within corresponding gaming environments of each user. In particular, state sharing module 117 is configured to manage states for each of the users in the multi-player gaming session. For example, state data may include game state data that defines the state of the game play (of a gaming application) for a corresponding user 115A at a particular point, as previously described. Further, state data may include user saved data that includes information that personalizes the video game for the corresponding player, as previously described. For example, this includes information associated with the user's character, so that the video game is rendered with a character that may be unique to that user (e.g., shape, look, clothing, weaponry, etc.). In that manner, the multi-player processing engine 119 using the state sharing data 117 and multi-player logic 118 is able to overlay/insert objects and characters into each of the gaming environments of the users participating in the multi-player gaming session. This allows for interaction between users in the multi-player gaming session via each of their respective gaming environments (e.g., as displayed on a screen).

Figure 1C:
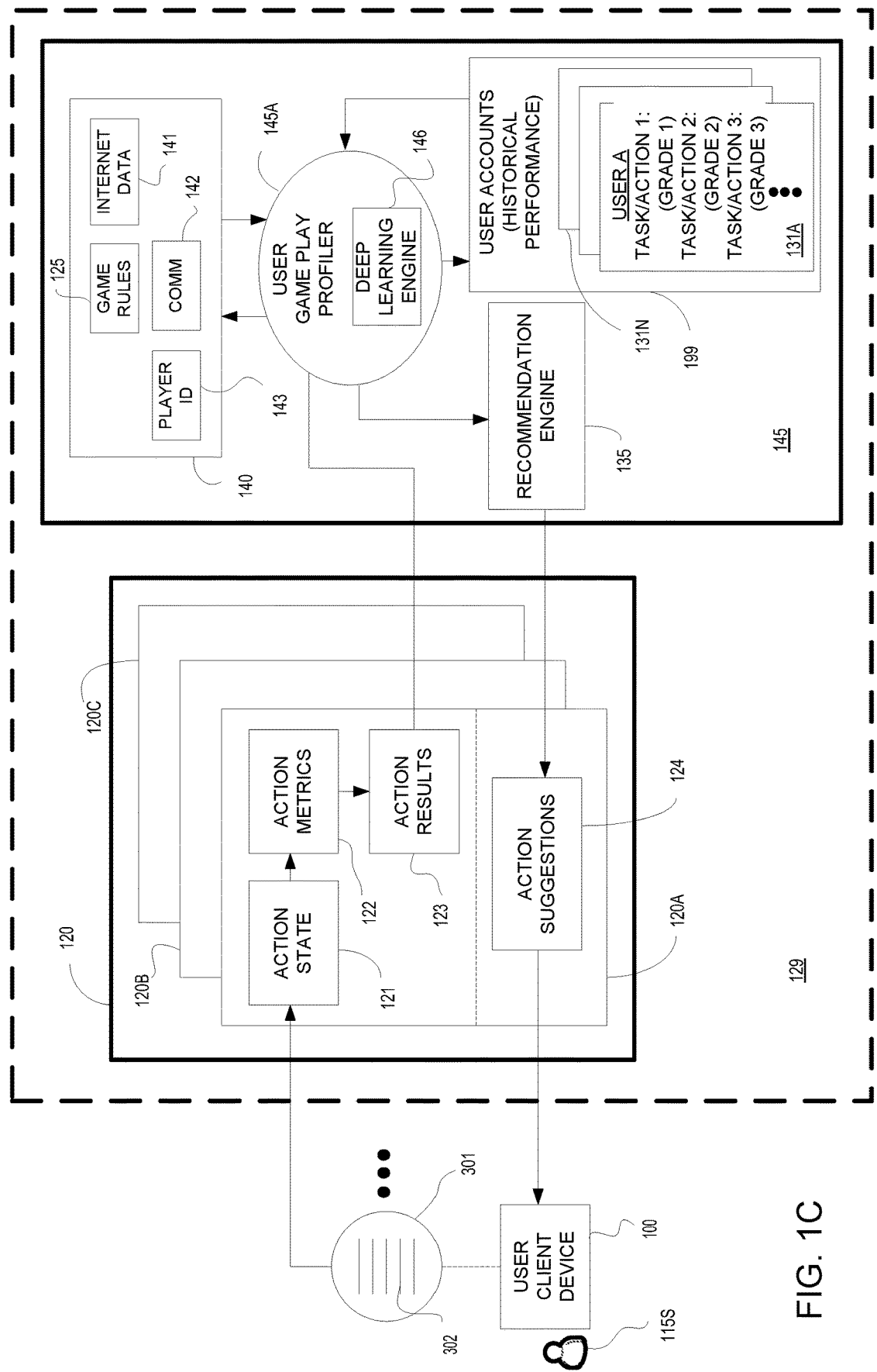
FIG. 1C illustrates an automated artificial intelligence (AI) personal assistance system of FIG. 1A, in accordance with one embodiment of the present disclosure.

FIG. 1C illustrates an automated artificial intelligence (AI) personal assistance system 129 that includes the profiler engine 145 and AI personal assistant 120 of FIGS. 1A-B, in accordance with one embodiment of the present disclosure. AI personal assistant system 129 is configured to provide gaming assistance to one or more users playing a gaming application in single-player mode or multi-player mode based on the proficiency of the corresponding user or users in comparison with game plays of other players playing the gaming application. As shown, the AI personal assistant 120 and the profiler engine 145 of system 129 work together to provide gaming assistance, and may be located together, or remotely from each other, as previously described. In one embodiment, each user is supported by a separate AI personal assistant system 129, which includes at least a dedicated AI personal assistant 120 that is supported by a back end profiler engine 145, in combination. For example, as shown in FIG. 1C, user 115S is supported by AI personal assistant 120A that is in communication with the user game play profiler 145A of profiler engine 145. Similarly, another user (not shown) may be supported by AI personal assistant 120B that is in communication with the user game play profiler 145A of profiler engine 145. Still another user (not shown) may be supported by AI personal assistant 120C that is in communication with the user game play profiler 145A of profiler engine 145.

As shown, AI personal assistant system 129 is configured for monitoring game play of a user playing a gaming application. In particular, the AI personal assistant 120 is configured for monitoring game play of the user and collecting user data that can be used for artificial intelligence (AI) purposes. In the game play, currently the user has a defined task 301 to accomplish. The task may include a single action or sub-task, or multiple actions or sub-tasks, as indicated by the hash marks within task 301, as is further described in FIG. 3 below. Also, the task may include no actions or sub-tasks. Further, the task is defined by a task type, such that similar tasks may be grouped under a single task type. These tasks may have similar goals, perform similar actions or sub-tasks to complete the task, or share other similarities. By grouping tasks under a task type, game plays of users addressing tasks of the task type may be analyzed to learn appropriate actions to take, the actions to avoid, the best styles of game plays, and the most efficient styles of game play for successfully completing those tasks for a particular gaming application, for a genre of gaming applications, or for gaming applications in general.

In another embodiment, the game plays of the user are monitored by AI personal assistant 120. That is, a plurality of game plays of the user playing a plurality of gaming applications is monitored. The game plays include a plurality of tasks to address and/or accomplish. Each of the tasks monitored is defined by a corresponding task type. In that manner, tasks of the same type can be analyzed to determine the gaming style, gaming habits, and proficiency of the user, especially when addressing the current task. That information is helpful in determining what type of assistance, if any, and the degree of assistance that is needed and/or wanted by the user when addressing a current task of a particular task type.

As such, for every response taken by the user 115A of client device 100 to address a task or subtask or action, the action state 121, action metrics 122, and action results 123 are collected by a corresponding AI personal assistant 120 (located locally or remotely). Reponses may be defined generally and include strategic decisions made by the user 115A (e.g., attack now vs. later, collect coins diligently or poorly, etc.), directions taken in the game play (e.g., traveling to city 1 vs city 2), choices made (equip with armor 1 or armor 2). Also, responses may be defined specific to a task, such as how a user 115A addressed the actions or sub-tasks (e.g., in what order, success in completing the sub-tasks, etc.).

In particular, the action state 121 defines the action, sub-task, or task that is addressed within the context or gaming environment of the gaming application. The gaming environment will help determine what kind of action type describes the task. For example, certain actions may be classified differently depending on the gaming environment. The actions may be classified under a first type when the gaming environment is relaxed (e.g., general traversing from one location to another), but classified under a second type when the gaming environment is tense (e.g., battling the boss). Further, action metrics 122 are collected by the corresponding AI personal assistant 125. These metrics are associated with the responses taken by the user 115A in addressing the task, sub-tasks, or actions. Also, action results 123 are collected by the corresponding AI personal assistant 125. For example, results 123 include whether the user 115A was successful in accomplishing the task, sub-task, or action. Also, results 123 may define how well (e.g., efficiency) the user 115A performed in addressing the task, sub-task, or action.

The collected data (e.g., action state 121, action metrics 122, and actions results 123) are delivered to profiler engine 145 for further analysis (e.g., providing recommendations). Specifically, the collected data is delivered to the user game play profiler 145A that compares the collected data for the user 115A against the current and historical performance of the user 115A as well as historical performances of other users, when playing the gaming application, a genre of gaming applications, or gaming applications in general, and especially when addressing a task of a particular task type. In that manner, the user game play profiler 145A is able to build a gaming profile for each user, as identified by a corresponding player ID stored in data store 143, within the game cloud system 210. The gaming profiles are based on corresponding user data, game rules 125 of one or more gaming applications of one or more gaming applications, wherein game rules 125 are stored in data store 140.

In one embodiment, a plurality of game plays of a plurality of users is monitored by one or more AI personal assistant systems 129. The game plays are associated with a plurality of gaming applications. The game plays include a plurality of tasks to address and/or accomplish, wherein each task is defined by a corresponding task type, as previously described. As such, the collected data can be used to build gaming profiles for a plurality of users, as previously described. Further, the task type proficiency rule and/or player proficiency score is determined based on results of a plurality of players (e.g., performance of the players) addressing a plurality of tasks of the task type.

In particular, gaming profiles 131A-N are created by the user game play profiler 145. For purposes of illustration, a gaming profile may include historical performance of a user A when addressing a plurality of tasks. Each of the tasks may be given a grade of performance. For example, the gaming profile 131A of user 115A shows a grade 1 for task/sub-task/action 1, grade 2 for task/sub-task/action 2, grade 3 for task/sub-task/action 3, and so on. These grades may be used to determine an overall proficiency of user 115A when addressing any task of any type, or to determine a proficiency of user 115A when addressing a task of a particular type, as described below.

The data in gaming profiles 131A-N may be fed back to the deep learning engine 146 of the user game play profiler 145. Deep learning engine 146 utilizes artificial intelligence, including deep learning algorithms, reinforcement learning, or other artificial intelligence-based algorithms A discussion on deep learning is provided in relation to FIG. 1D. In that manner, the analysis on the collected data may be continually performed to provide updated analytics used for providing assistance to users. For example, the task type proficiency rule may be upgraded to reflect new data.

Further, the collected data can be used to determine a proficiency (e.g., a user proficiency score) of the user when addressing a task of a particular task type. In particular, a task type is further defined by a task type proficiency rule, wherein the proficiency of the user is determined based on the task type proficiency rule. The rule is determined based on results of a plurality of users addressing a plurality of tasks of the task type. That is, data (e.g., action state 121, action metrics 122, and action results 123) from a plurality of users addressing a plurality of tasks of the task type in one or more gaming applications is analyzed to generate the task type proficiency rule. For example, the rule may define an average response to tasks of that task type, wherein the average response includes average time it takes to accomplish a task, or average number of commands necessary to accomplish task, etc. The rule may be adjusted to be more aggressive or less aggressive, such that a more aggressive rule defines responses of a better than average user and/or player, and a less aggressive rule defines responses of a less than average user.

In one embodiment, the proficiency of a user when addressing a particular task may be determined (e.g., user proficiency score) for a particular gaming application, and is based on current game play of the user participating in the gaming application, past game play of the user participating in the gaming application, and may consider historical game play of the user participating in gaming applications of the same genre (e.g., playing style) or of multiple genres (e.g., overall playing style). For example, the user proficiency score may be based on past performance of the user when encountering the plurality of tasks faced by the user. In another embodiment, the user proficiency score may be based on current performance of the user when encountering the task, wherein only game play of the user in this particular gaming application is considered. In one embodiment, the user proficiency score is based on past performance of the user when encountering a plurality of tasks of the task type, and based on current performance of the user when encountering the current task.

In another embodiment, the proficiency is given for a genre of gaming applications, and is based on game play of the user participating in the gaming application, and may consider historical game play of the user participating in gaming applications of the same genre (e.g., playing style). In still another embodiment, the proficiency is given for addressing any task of a task type of a plurality of gaming applications of one or more genres, and is based on game play of the user participating in the gaming application, and may consider historical game play of the user participating in gaming applications of the same genre (e.g., playing style).

The current proficiency score is also included into past performances of the user, when determining future proficiency scores. That is, the current performance of the user is stored and considered when determining future proficiency scores.

The deep learning engine 146 of user game play profiler 145A is able to collect data 141 (e.g., internet data) over social networks to identify problems, game play difficulties, etc. within a gaming application. For example, users may post to a gaming blog asking questions on how to beat a particular section of a gaming application. The deep learning engine 146 can use that data to identify difficult tasks to build a database including various approaches to the tasks as played by multiple players, and their relative successes and/or failures when addressing those tasks. Also, the user game play profiler 145A of the game title processing engine 130 is configured to analyze communications 142 of a particular user, or communications between users for use in identifying problems, game play difficulties, etc. within a gaming application, as previously described.

Furthermore, the user game play profiler 145A is able to determine a user predictive rate of success in accomplishing the given task based on the user proficiency score, the task type proficiency rule, and the task presented to the user. The predictive rate of success may consider a given gaming environment experienced by the user.

As a result, the recommendation engine 135 is configured for determining a recommendation for the user based on the user predictive rate of success for the current task. That is, the recommendation is generated based on the proficiency of the user, wherein the proficiency may consider one or more of the following: the performance of the user during a current game play, historical performance of the user of past game plays in association with multiple gaming applications in general or of a particular genre, the playing style of the user in association with gaming applications in general or of a particular genre. In one embodiment, the recommendation includes a recommended action or response by the user that facilitates accomplishing the task. The recommendation engine 135 delivers the recommendation or recommendations to the localized AI personal assistant 125, which is displayed on the user client device 100. For example, the recommendation may include an action suggestion 124.

In one embodiment, the user game play profiler 145A is configured to provide assistance to a team of members that are given a set of tasks to accomplish. Because the user game play profiler 145A is able to determine and/or access the game play profiles of each of the team members, information in the profiles can be used to determine how to best utilize team members to successfully accomplish the set of tasks, and more importantly to assign tasks to team members such that the tasks are completed in the most efficient manner, and/or assign tasks to team members in order to maximize the probability of success for accomplishing a related goal (e.g., completing the set of tasks, winning the competition, completing the gaming application, etc.). That is, the user game play profiler 145A is configured to provide gaming assistance based on a predictive model that determines probabilities of success for the team when completing a set of tasks. A probability of success is determined for each combination of assigned tasks to team members, wherein the probability of success is determined based on the gaming profiles of the members, the set of tasks, and the current gaming environment.

Figure 1D:
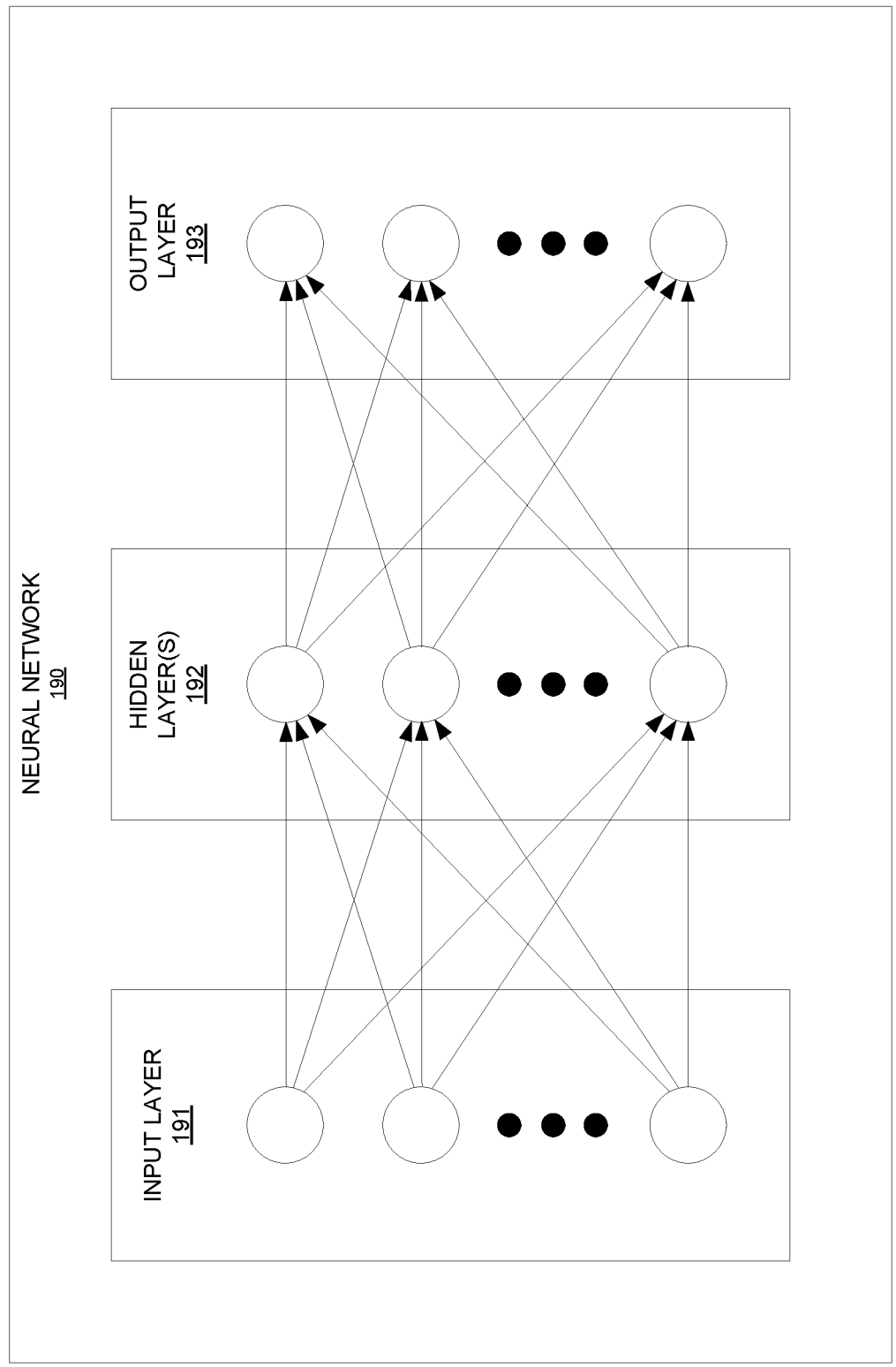
FIG. 1D illustrates an example neural network used to train a profiler engine, in accordance with one embodiment of the present disclosure.

FIG. 1D illustrates an example neural network 190 used to train the deep learning engine 146 in support of one or more modules of the AI personal assistance system 120, in accordance with one embodiment of the present disclosure. For example, the neural network 190 represents an example of an automated analysis tool for analyzing data sets used by the user game play profiler 145A to determine game play profiles for the plurality of users 115. In particular, an instance of the neural network 190 may be used to train the user game play profiler 145A to determine the game play profile for the plurality of users 115 and/or to provide recommendations during game play of a particular user.

Different types of neural networks 190 are possible. In an example, the neural network 190 supports deep learning that may be implemented by deep learning engine 146. Accordingly, a deep neural network, a convolutional deep neural network, and/or a recurrent neural network using supervised or unsupervised training can be implemented. In another example, the neural network 190 includes a deep learning network that supports reinforcement learning. For instance, the neural network 190 is set up as a Markov decision process (MDP) that supports a reinforcement learning algorithm.

Generally, the neural network 190 represents a network of interconnected nodes, such as an artificial neural network. Each node learns some information from data. Knowledge can be exchanged between the nodes through the interconnections. Input to the neural network 190 activates a set of nodes. In turn, this set of nodes activates other nodes, thereby propagating knowledge about the input. This activation process is repeated across other nodes until an output is provided.

As illustrated, the neural network 190 includes a hierarchy of nodes. At the lowest hierarchy level, an input layer 191 exists. The input layer 191 includes a set of input nodes. Each of these input nodes is mapped to a user game play profile feature (e.g., features specific to interactions of a user with a video game, to a user playing a video game, to a video game, etc.).

At the highest hierarchical level, an output layer 193 exists. The output layer 193 includes a set of output nodes. An output node represents a decision that relates to one or more components of a user game play profiler, for example. As previously described, the output nodes may identify problems, difficult tasks, approaches to complete a specific task within a gaming application, other game play difficulties within a gaming application, predicting a rate of success for a user regarding a particular type of task or a particular task, predicting a rate of success for a team of members that are given a set of tasks to accomplish, determine a proficiency score for a user and/or team, determine a recommendation, provide assistance, etc. The nodes in the neural network 190 learn the parameters of the model that can be used to make such decisions.

A hidden layer 192 exists between the input layer 191 and the output layer 193. The hidden layer 192 includes "N" number of hidden layers, where "N" is an integer greater than or equal to one. In turn, each of the hidden layers also includes a set of hidden nodes.

The input nodes are interconnected to the hidden nodes. Likewise, the hidden nodes are interconnected to the output nodes. However, the input nodes are not directly interconnected to the output nodes. If multiple hidden layers exist, the input nodes are interconnected to the hidden nodes of the lowest hidden layer. In turn, these hidden nodes are interconnected to the hidden nodes of the next hidden layer, and so on and so forth. The hidden nodes of the next highest hidden layer are interconnected to the output nodes.

An interconnection connects two nodes. The interconnection has a numerical weight that can be learned. (e.g., based on the user game play profiler, recommendation data set, etc.), rendering the neural network 190 adaptive to inputs and capable of learning.

Generally, the hidden layer 192 allows knowledge about the input nodes to be shared among all the tasks corresponding to the output nodes. To do so, a transformation f is applied to the input nodes through the hidden layer 192. In an example, the transformation f is non-linear. Different non-linear transformations f are available including, for instance, a rectifier function $f(x)=\max(0,x)$.

The neural network 190 also uses a cost function c to find an optimal solution. The cost function measures the deviation between the prediction that is output by the neural network 190 defined as $f(x)$, for a given input x and the ground truth or target value y. The optimal solution represents a situation where no solution has a cost lower than the cost of the optimal solution. An example of a cost function is the mean squared error between the prediction and the ground truth, for data where such ground truth labels are available. During the learning process, the neural network 190 can use back-propagation algorithms to employ different optimization methods to learn model parameters that minimize the cost function. An example of such an optimization method is stochastic gradient descent.

In an example, the training dataset for the neural network 190 is from a same data domain. For instance, the neural network 190 is trained for a specific gaming application. In this illustration, the data domain includes game session data collected for interactions of players with the video game. In another example, the training dataset is from different data domains. For instance, the neural network 190 is trained for a genre of gaming applications.

As such, the neural network 190 may define a predictive model that is used to predict a rate of success for a user regarding a particular type of task or a particular task that is based on a user proficiency score and a task type proficiency rule. In addition, the neural network 190 may define a predictive model that is used to predict a rate of success for a team of members that are given a set of tasks to accomplish. Based on these predictive results, one or more recommendations may be provided to the user or to the team of members.

Figure 2:
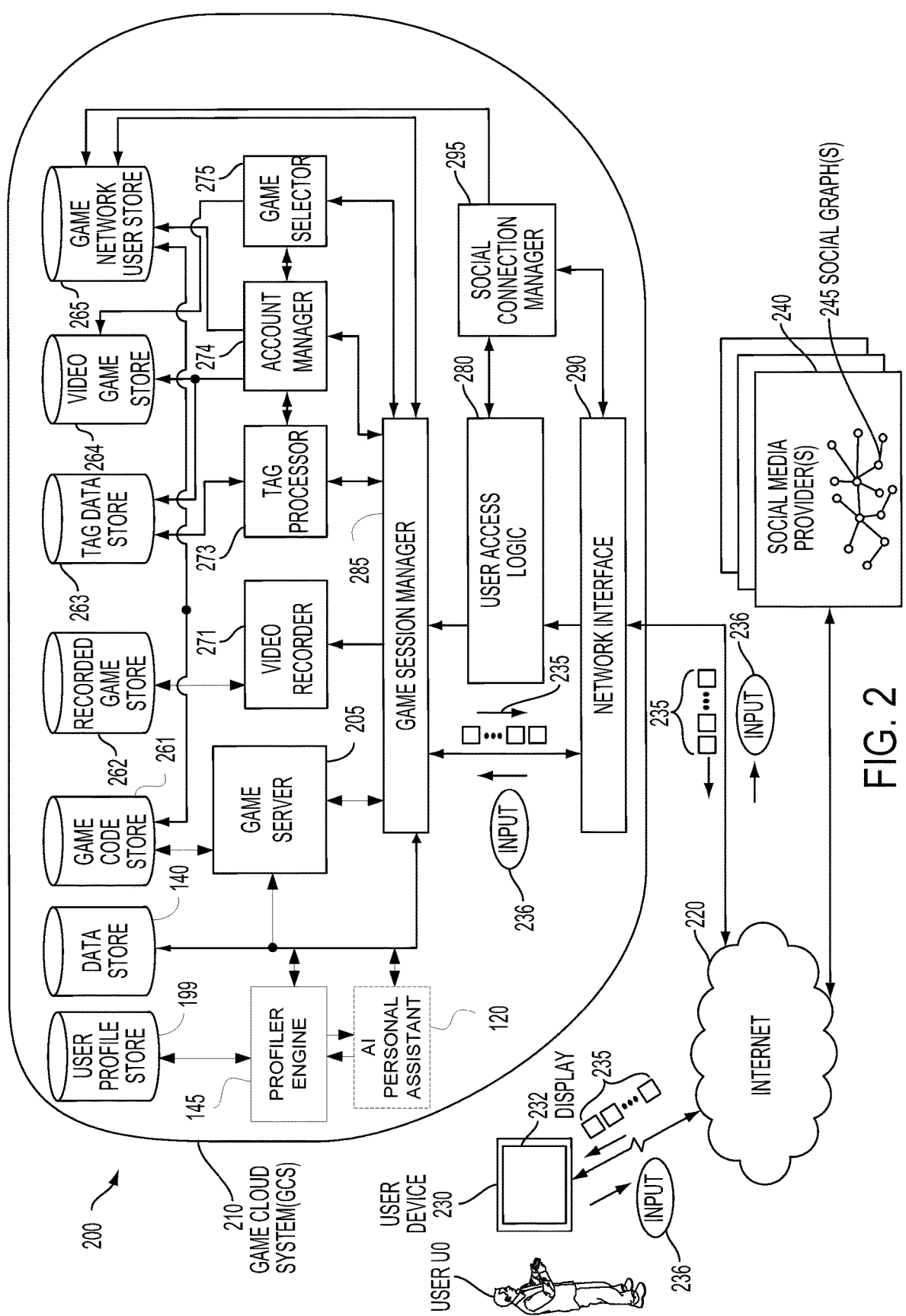
FIG. 2 illustrates a system diagram 200 for providing automated AI personal assistance to a user playing a gaming application as executed over a cloud game network, in accordance with one embodiment of the present disclosure.

FIG. 2 illustrates a system diagram 200 for enabling access and playing of video games stored in a game cloud system (GCS) 210, in accordance with an embodiment of the disclosure. Generally speaking, game cloud system GCS 210 may be a cloud computing system operating over a network 220 to support a plurality of users. Additionally, GCS 210 is configured to provide assistance to one or more users playing a gaming application in a single-player mode or multi-player mode using the game title processing engine 130 and localized AI personal assistant 120. Further, game title processing engine 130 and one or more AI personal assistants 120 (local or remote) of GCS 210 are configured to provide gaming assistance to a team of members, such that assignment of tasks or sub-tasks or actions to members is made to increase the probability of successfully completing a goal (e.g., complete a set of tasks, win a gaming competition, win the gaming application, etc.). In particular, system 200 includes GCS 210, one or more social media providers 240, and a user device 230, all of which are connected via a network 220 (e.g., internet). One or more user devices may be connected to network 220 to access services provided by GCS 210 and social media providers 240.

In one embodiment, game cloud system 210 includes a game server 205, a video recorder 271, a tag processor 273, and account manager 274 that includes a user profile manager, a game selection engine 275, a game session manager 285, user access logic 280, a network interface 290, and a social media manager 295. GCS 210 may further include a plurality of gaming storage systems, such as a user gaming profile store, game logic store, gaming application rules store, state sharing store, internet data store, game state store, random seed store, user saved data store, snapshot store, which may be stored generally in datastore 140. Other gaming storage systems may include a game code store 261, a recorded game store 262, a tag data store 263, video game data store 264, and a game network user store 265. In one embodiment, GCS 210 is a system that can provide gaming applications, services, gaming related digital content, and interconnectivity among systems, applications, users, and social networks. GCS 210 may communicate with user device 230 and social media providers 240 through social media manager 295 via network interface 290. Social media manager 295 may be configured to relate one or more friends. In one embodiment, each social media provider 240 includes at least one social graph 245 that shows user social network connections.

User $U_0$ is able to access services provided by GCS 210 via the game session manager 285, wherein user $U_0$ may be representative of user 5 of FIG. 1. For example, account manager 274 enables authentication and access by user $U_0$ to GCS 210. Account manager 274 stores information about member users. For instance, a user profile for each member user may be managed by account manager 274. The account manager 274 may be configured to manage the gaming profile for member users, in one implementation. For instance, member information can be used by the account manager 274 for authentication purposes. For example, account manager 274 may be used to update and manage user information related to a member user. Additionally, game titles owned by a member user may be managed by account manager 274. In that manner, video games stored in data store 264 are made available to any member user who owns those video games.

In one embodiment, a user, e.g., user $U_0$, can access the services provided by GCS 210 and social media providers 240 by way of user device 230 through connections over network 220. User device 230 can include any type of device having a processor and memory, wired or wireless, portable or not portable. In one embodiment, user device 230 can be in the form of a smartphone, a tablet computer, or hybrids that provide touch screen capability in a portable form factor. One exemplary device can include a portable phone device that runs an operating system and is provided with access to various applications (apps) that may be obtained over network 220, and executed on the local portable device (e.g., smartphone, tablet, laptop, desktop, etc.).

User device 230 includes a display 232 that acts as an interface for user $U_0$ to send input commands 236 and display data and/or information 235 received from GCS 210 and social media providers 240. Display 232 can be configured as a touch-screen, or a display typically provided by a flat-panel display, a cathode ray tube (CRT), or other device capable of rendering a display. Alternatively, the user device 230 can have its display 232 separate from the device, similar to a desktop computer or a laptop computer.

In one embodiment, user device 130 is configured to communicate with GCS 210 to enable user $U_0$ to play a video game or gaming application. For example, user $U_0$ may select (e.g., by game title, etc.) a video game that is available in the video game data store 264 via the game selection engine 275. In that manner, the selected video game is enabled and loaded for execution by game server 205 on the GCS 210. In one embodiment, game play is primarily executed in the GCS 210, such that user device 230 will receive a stream of game video frames 235 from GCS 210, and user input commands 236 for driving the game play is transmitted back to the GCS 210. The received video frames 235 from the streaming game play are shown in display 232 of user device 230.

In one embodiment, after user $U_0$ chooses an available game title to play, a game session for the chosen game title may be initiated by the user $U_0$ through game session manager 285. Game session manager 285 first accesses game state store in data store 140 to retrieve the saved game state of the last session played by the user $U_0$ (for the selected game), if any, so that the user $U_0$ can restart game play from a previous game play stop point. Once the resume or start point is identified, the game session manager 285 may inform game execution engine in game processor 210 to execute the game code of the chosen game title from game code store 261. After a game session is initiated, game session manager 285 may pass the game video frames 235 (i.e., streaming video data), via network interface 290 to a user device, e.g., user device 230. In another embodiment, game session manager 285 may provide multi-player session management independent of or in conjunction with the multiplayer session controller 121 of FIG. 1A.

During game play, game session manager 285 may communicate with game processor 210, recording engine 271, and tag processor 273 to generate or save a recording (e.g., video) of the game play or game play session. In one embodiment, the video recording of the game play can include tag content entered or provided during game play, and other game related metadata. Tag content may also be saved via snapshots. The video recording of game play, along with any game metrics corresponding to that game play, may be saved in recorded game store 262. Any tag content may be saved in tag data stored 263.

During game play, game session manager 285 may communicate with game processor 204 to deliver and obtain user input commands 236 that are used to influence the outcome of a corresponding game play of a video game. Input commands 236 entered by user $U_0$ may be transmitted from user device 230 to game session manager 285 of GCS 210. Input commands 236, including input commands used to drive game play, may include user interactive input, such as including tag content (e.g., texts, images, video recording clips, etc.). Game input commands as well as any user play metrics (how long the user plays the game, etc.) may be stored in game network user store 165. Select information related to game play for a video game may be used to enable multiple features that may be available to the user. For example, in embodiments data relating to the proficiency of a corresponding user in participating in a video game, or genre of gaming applications, or gaming applications in general may be collected and stored in game network user store 265. Because game plays are executed on GCS 210 by multiple users gaming profiles may be generated for every user. In that manner, the game play of a user may be compared with game plays of multiple users to determine how well the user is playing the video game, and whether the user can benefit from recommendations provided by the game title processing engine 130 and localized AI personal assistant 120. Assistance to users in a single-player mode or multi-player mode can enhance the experience of the users playing a gaming application or video game by facilitating efficient game play and by helping users proceed through harder and/or impossible sections of the gaming application. In the case of user $U_0$, user device provides an interface allowing user $U_0$ to receive communications from a back end server (e.g., game title processing engine 130 of GCS 210 providing gaming assistance during the game play of user $U_0$.

Figure 3:
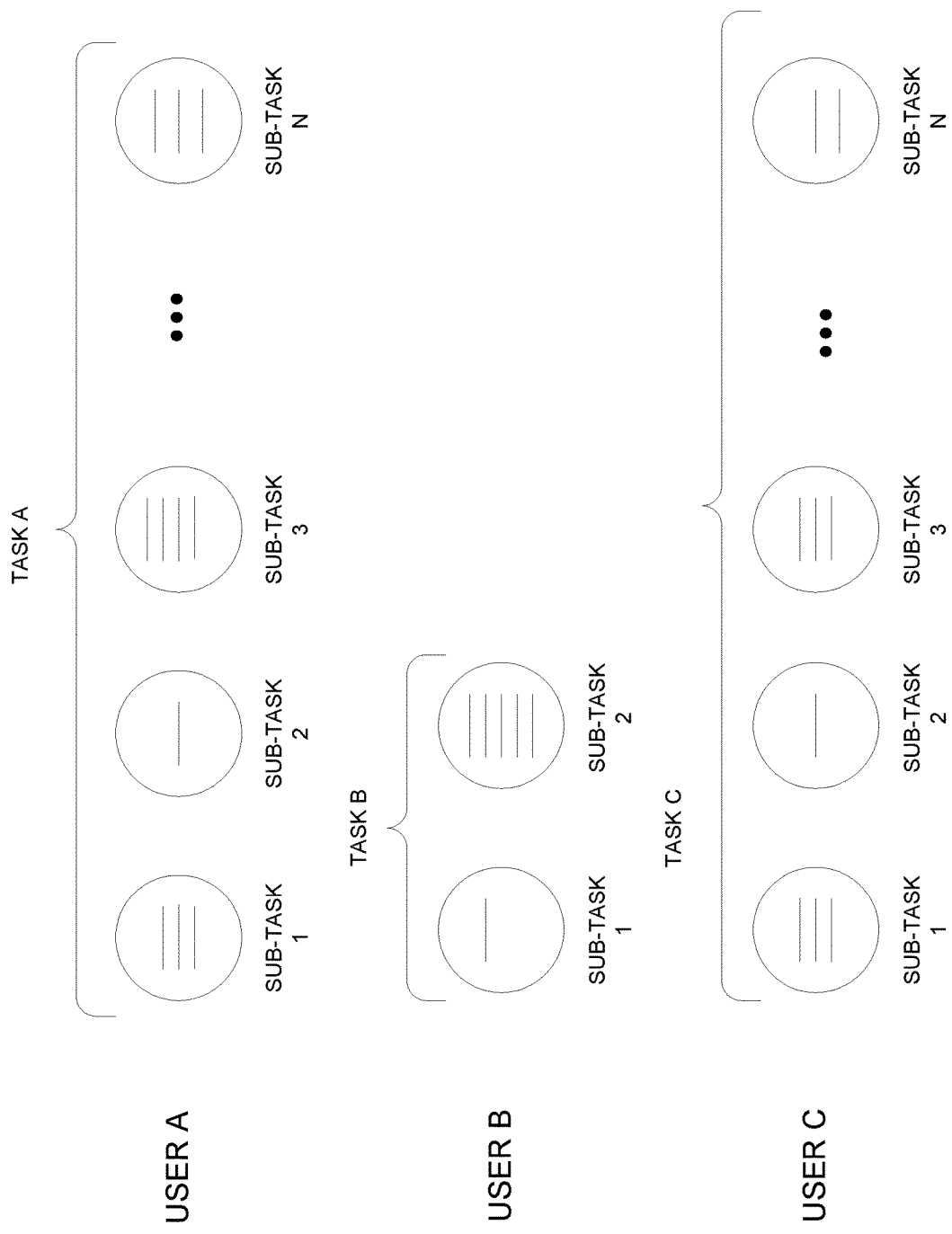
FIG. 3 illustrates tasks and subtasks that are assigned to members of a team that are participating in a multi-player gaming application, in accordance with one embodiment of the present disclosure.

FIG. 3 illustrates tasks and subtasks that may be assigned to members of a team that are participating in a multi-player gaming application, in accordance with one embodiment of the present disclosure. Task assignment is determined based on the predictive model to provide the highest probability of success for completing the set of tasks given to the team members, as previously described. For example, the team consists of three members: user A, user B, and user C. Task A has been assigned to user A, wherein task A includes N sub-tasks. Each of the sub-tasks may include one or more actions. For example, sub-task 1 of task A includes three actions (as indicated by the three hash marks), sub task 2 includes one action, sub-task 3 includes 4 actions, . . . and sub-task N includes 3 actions. As shown, sub-tasks may include one or more actions, though some sub-tasks may include no actions. Further, task B has been assigned to user B, wherein task B includes 2 sub-tasks: sub-task 1 of task B includes 1 action, and sub-task 2 of task B includes 5 actions. Also, task C has been assigned to user C, wherein task C includes N sub-tasks. For example, sub-task 1 of task C includes 3 actions, sub-task 2 includes 1 action, sub-task 3 includes 3 actions, . . . , and sub-task N includes 2 actions.

Though FIG. 3 is shown for tasks and sub-tasks that assigned to team members of a team, the task assigned to one member of the team may be representative of a task presented to a user participating in a gaming application, wherein gaming assistance may be provided to the user based on the proficiency of the user, as previously described in embodiments of the present disclosure.

Figure 4:
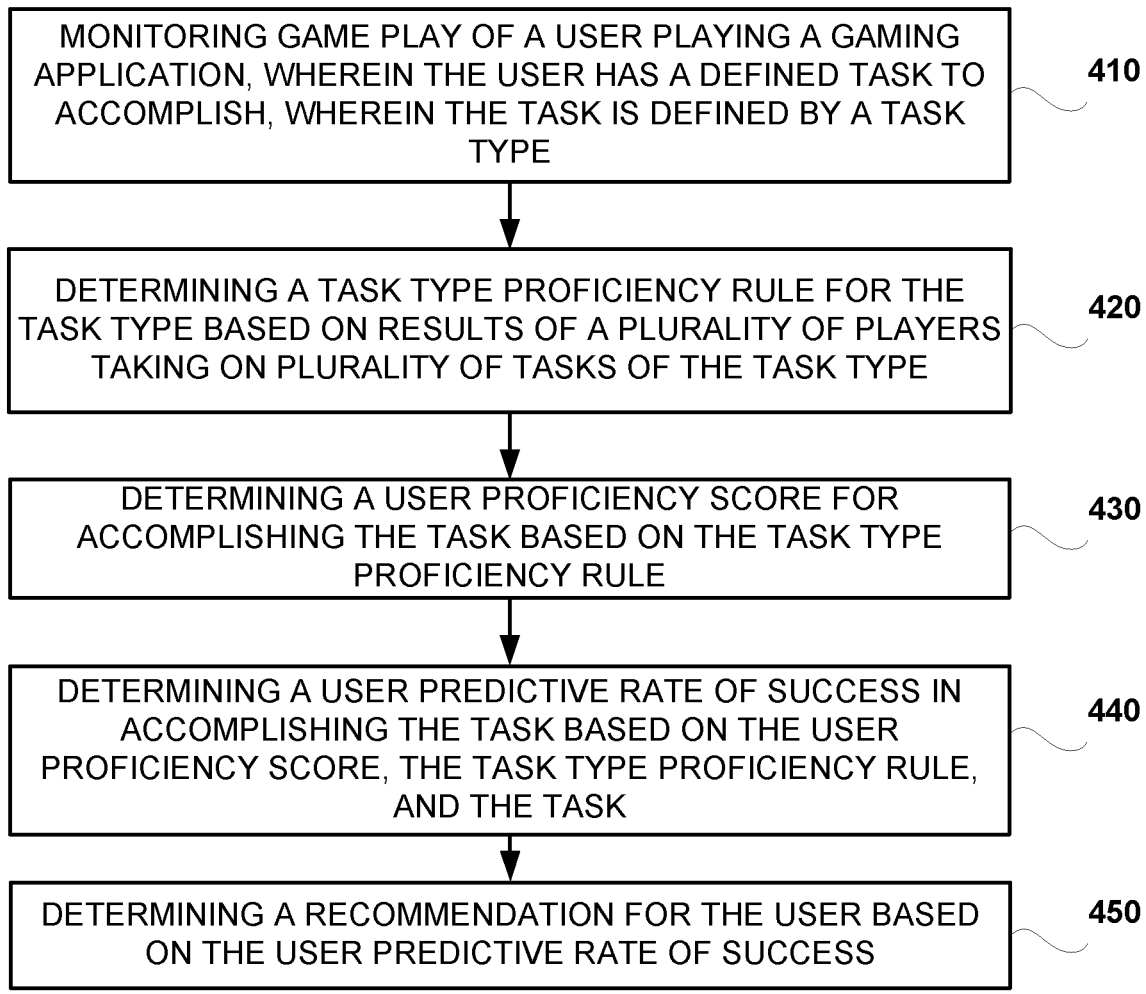
FIG. 4 is a flow diagram illustrating steps in a method for assisting the game play of a user playing a gaming application, in accordance with one embodiment of the present disclosure.

With the detailed description of the various modules of the gaming server and client device communicating over a network, a method for providing gaming assistance is now described in relation to flow diagram 400 of FIG. 4, in accordance with one embodiment of the present disclosure. Flow diagram 400 illustrates the process and data flow of operations involved at the artificial personal assistant system 129 for purposes of assisting the game play of a user participating in a gaming application.

At 410, the method includes monitoring game play of a user playing a gaming application, wherein the user has a defined task to accomplish, and wherein the task is defined by a task type. In that manner, data relating to the performance of the user is collected during a current game play of the gaming application. Over time and monitoring of multiple game plays of the user, data relating to the historical performance of the user during past game plays in association with the same gaming application, multiple gaming applications in general or of a particular genre is collected, such that the playing style of the user in association with multiple gaming applications in general or of a particular genre can be collected and later analyzed. For historical game play collection, a plurality of game plays of the user is monitored, wherein the user is participating in a specific gaming application, and/or a plurality of gaming applications. The game plays include a plurality of tasks to accomplish, each of which is defined by the task type. Another plurality of tasks may be defined, each of which is defined by another task type.

In one embodiment, the task type is limited to the task itself, that may be further identified as a task type. As such, data collected and analyzed is based on responses by the user and/or other players to the particular task as presented within game plays of the gaming application for the user and other players. In another embodiment, the task type includes tasks encountered in a plurality of game plays of the gaming application. In still another embodiment, the task type includes tasks encountered in a plurality of game plays of a plurality of gaming applications.

At 420, the method includes determining a task type proficiency rule for the task type based on results of a plurality of players addressing a plurality of tasks of the task type. For example, game plays of the players are monitored, wherein the players are playing a plurality of gaming applications. The game plays include a plurality of tasks to accomplish, each of which is defined by the task type. In that manner, the task type proficiency rule defines a baseline of how the user should act or respond when addressing the presented task. The task type proficiency rule may be specific to the presented task, or may generally apply to tasks of a task type. The task type proficiency rule may define a player proficiency score or threshold score.

At 430, the method includes determining a user proficiency score for accomplishing the task based on the task type proficiency rule. The user proficiency score may be based on past performance of the user when encountering a plurality of tasks in a plurality of gaming applications, wherein the tasks are of the task type. In one embodiment, the user proficiency score may be based on current performance of the user when encountering the task, such that only data from the game play of the gaming application is considered. Also, in other embodiments, the user proficiency score may be based on a combination of the current performance of the user when encountering the task, as well as past performances of the user when encountering a plurality of tasks of the same task type in a plurality of gaming applications.

At 440, the method includes determining a user predictive rate of success in accomplishing the task based on the user proficiency score, the task type proficiency rule, and the task. The gaming environment may also be considered. For example, if the proficiency of the user is poor, and the task is extremely difficult, the predictive rate of success may be low (e.g., less than 25 percent); however if the proficiency of the user is high, then the predictive rate of success may be high (e.g., higher than 70 percent), especially if the task is moderately difficult.

At 450, the method includes determining a recommendation for the user based on the user predictive rate of success. Again, following the example above of a user having poor proficiency that is presented with a difficult task, then a recommendation may be presented to the user. The recommendation may include suggestions on how the user should respond in addressing the task, sub-task, or action. For example, the recommendation may include a recommended response to set of commands or actions that facilitate accomplishing the task. The recommendation is tailored to the proficiency of the user. For example, the recommendation given to a user with low proficiency may be highly detailed (e.g., step by step instructions), whereas the recommendation given to a user with high proficiency may be extremely limited, or very brief with the intention of only giving a hint to the user, or include no recommendations.

Further, the recommendations given may be controlled by a sensitivity factor received from the user, wherein the sensitivity factor indicates whether a user is interested in receiving recommendations, and may range from extremely enthusiastic, indifferent, mildly against, extremely antagonistic, etc. For example, if the user is highly sensitive, then little or no recommendations are given. On the other hand, if the user is not sensitive, which indicates a desire to receive recommendation, then more recommendations may be given to the requesting user.

Figure 5:
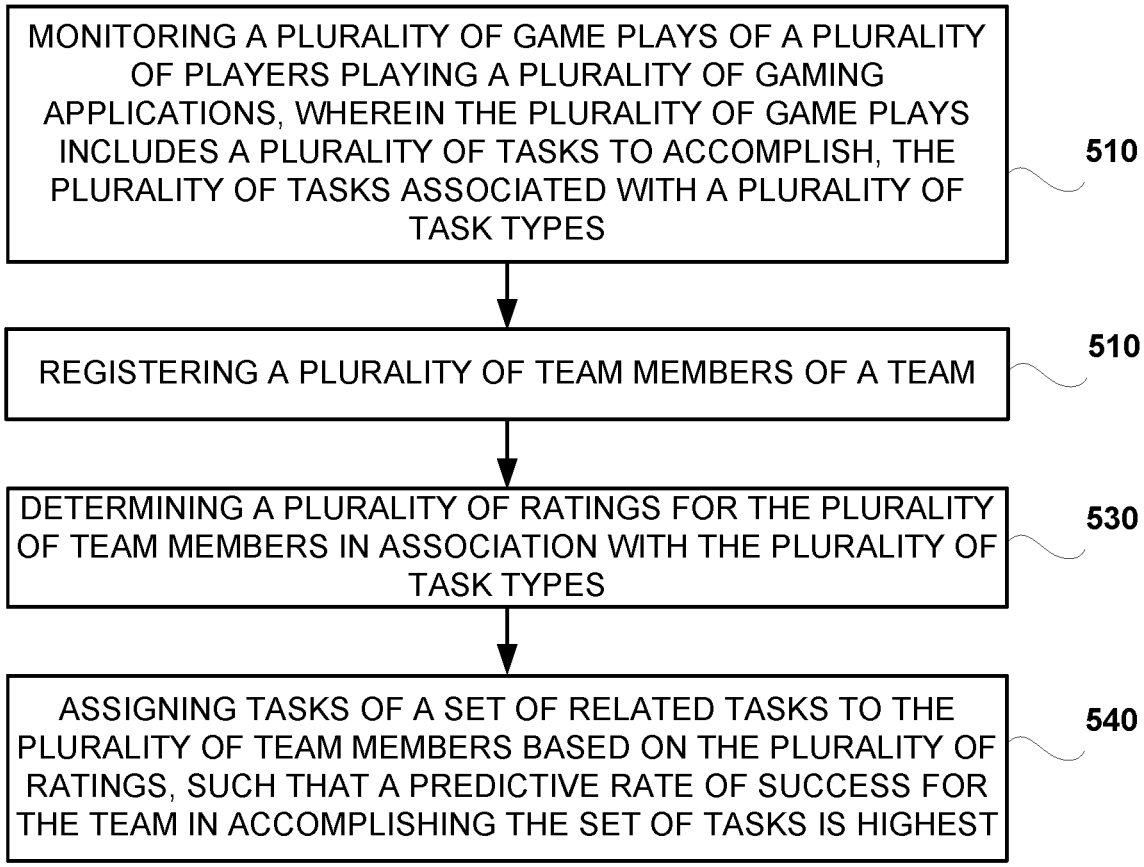
FIG. 5 is a flow diagram illustrating steps in a method for assigning tasks to team members of a team that are participating in a multi-player gaming application based on a predictive model assessing a success of the team accomplishing presented tasks that is based on past performances of the team members when performing tasks of the same type, in accordance with one embodiment of the disclosure.

FIG. 5 is a flow diagram illustrating steps in a method for assigning tasks to team members of a team that are participating in a multi-player gaming application based on a predictive model assessing a success of the team accomplishing presented tasks that is based on past performances of the team members when performing tasks of the same type, in accordance with one embodiment of the disclosure. That is, gaming assistance is provided to a team of members playing a gaming application in a multi-player gaming environment. The assistance is generated and provided based on a predictive model that determines probabilities of success for the team completing a set of tasks for various combinations of task assignments to team members. The predictive model considers gaming profiles of the members, the set of tasks, and the current gaming environment.

At 510, the method includes monitoring a plurality of game plays of a plurality of players playing a plurality of gaming applications. The plurality of game plays includes a plurality of tasks to accomplish, and the plurality of tasks is associated with a plurality of task types. In the manner, gaming profiles of the players may be generated based on performances of the corresponding player, historical performance of the corresponding player in association with the gaming application, or multiple gaming applications. Also, playing styles may be determined for the players. Further, proficiency ratings of the players may be determined based on performance of other players when encountering tasks of a task type, or tasks of one or more task types.

At 520, the method includes registering a plurality of team members of a team. The gaming profiles for each of the team members may be accessed.

At 530, the method includes determining a plurality of ratings for the plurality of team members in association with the plurality of task types. That is, user proficiency ratings for the team members are determined. These ratings can be used for assigning team members to tasks based on which member is best suited to accomplish a certain task.

At 540, the method includes assigning tasks of a set of related tasks to the plurality of team members based on the plurality of ratings, such that a predictive rate of success for the team in accomplishing the set of tasks is highest. In particular, for a plurality of combinations of task assignments from the set of related tasks, predictive rates of success for the team in accomplishing the set of tasks are determined. The predictive rates are determined based on the plurality of ratings, the set of tasks, and current conditions of a gaming environment of the gaming application. Then, tasks in the set of related tasks can be assigned to the team members in a selected combination such that a corresponding predictive rate of success for the team in accomplishing the set of tasks is highest.

This process may be performed when the set of tasks changes or is updated. For example, the set of related tasks may be redefined to a second set of related tasks to accomplish, wherein the set of tasks changes according to a plurality of events (e.g., the loss of a team member, passing of a period of time, accomplishment of a task from the set, addition of a new team member, etc.). The tasks in the second plurality of tasks can be assigned according to a selected combination to the plurality of team members based on the plurality of ratings, such that a predictive rate of success for the team in accomplishing the set of tasks is highest.

While specific embodiments have been provided that illustrate the provision of gaming assistance to one or more users participating in a gaming application in a single-player mode or multi-player mode, these are described by way of example and not by way of limitation. Those skilled in the art having read the present disclosure will realize additional embodiments falling within the spirit and scope of the present disclosure.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A Game Processing Server (GPS) (or simply a "game server") is used by game clients to play single and multi-player video games. Most video games played over the Internet operate via a connection to the game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices to exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by a software company that owns the game title, allowing them to control and update content.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the embodiments described herein may be executed on any type of client device. In some embodiments, the client device is a head mounted display (HMD).

Figure 6:
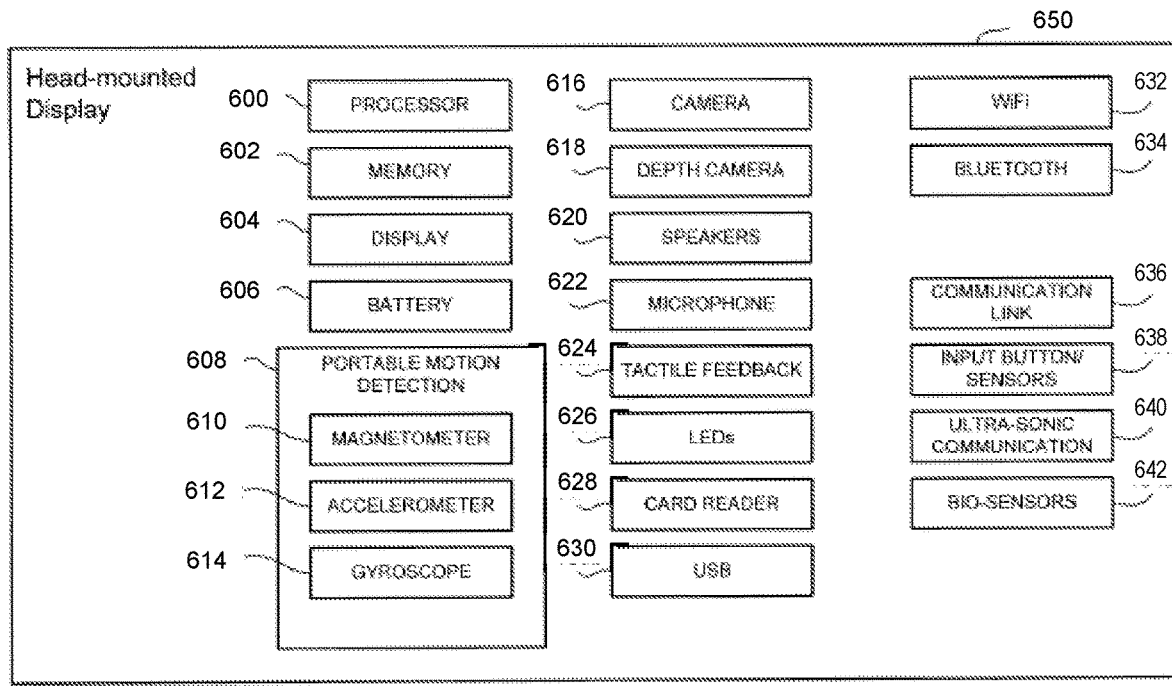
FIG. 6 is a diagram illustrating components of a head-mounted display, in accordance with an embodiment of the disclosure.

FIG. 6, a diagram illustrating components of a head-mounted display 650 is shown, in accordance with an embodiment of the disclosure. The head-mounted display 650 includes a processor 600 for executing program instructions. A memory 602 is provided for storage purposes, and may include both volatile and non-volatile memory. A display 604 is included which provides a visual interface that a user may view. A battery 606 is provided as a power source for the head-mounted display 650. A motion detection module 608 may include any of various kinds of motion sensitive hardware, such as a magnetometer 610, an accelerometer 612, and a gyroscope 614.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 612 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 610 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 612 is used together with magnetometer 610 to obtain the inclination and azimuth of the head-mounted display 650.

A gyroscope is a device for measuring or maintaining orientation, based on the principles of angular momentum. In one embodiment, three gyroscopes 614 provide information about movement across the respective axis (x, y and z) based on inertial sensing.

The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 616 is provided for capturing images and image streams of a real environment. More than one camera may be included in the head-mounted display 650, including a camera that is rear-facing (directed away from a user when the user is viewing the display of the head-mounted display 650), and a camera that is front-facing (directed towards the user when the user is viewing the display of the head-mounted display 650). Additionally, a depth camera 618 may be included in the head-mounted display 650 for sensing depth information of objects in a real environment.

In one embodiment, a camera integrated on a front face of the HMD may be used to provide warnings regarding safety. For example, if the user is approaching a wall or object, the user may be warned. In one embodiment, the use may be provided with an outline view of physical objects in the room, to warn the user of their presence. The outline may, for example, be an overlay in the virtual environment. In some embodiments, the HMD user may be provided with a view to a reference marker, that is overlaid in, for example, the floor. For instance, the marker may provide the user a reference of where the center of the room is, which in which the user is playing the game. This may provide, for example, visual information to the user of where the user should move to avoid hitting a wall or other object in the room. Tactile warnings can also be provided to the user, and/or audio warnings, to provide more safety for when the user wears and plays games or navigates content with an HMD.

The head-mounted display 650 includes speakers 620 for providing audio output. Also, a microphone 622 may be included for capturing audio from the real environment, including sounds from the ambient environment, speech made by the user, etc. The head-mounted display 650 includes tactile feedback module 624 for providing tactile feedback to the user. In one embodiment, the tactile feedback module 624 is capable of causing movement and/or vibration of the head-mounted display 650 so as to provide tactile feedback to the user.

LEDs 626 are provided as visual indicators of statuses of the head-mounted display 650. For example, an LED may indicate battery level, power on, etc. A card reader 628 is provided to enable the head-mounted display 650 to read and write information to and from a memory card. A USB interface 630 is included as one example of an interface for enabling connection of peripheral devices, or connection to other devices, such as other portable devices, computers, etc. In various embodiments of the head-mounted display 650, any of various kinds of interfaces may be included to enable greater connectivity of the head-mounted display 650.

A WiFi module 632 is included for enabling connection to the Internet via wireless networking technologies. Also, the head-mounted display 650 includes a Bluetooth module 634 for enabling wireless connection to other devices. A communications link 636 may also be included for connection to other devices. In one embodiment, the communications link 636 utilizes infrared transmission for wireless communication. In other embodiments, the communications link 636 may utilize any of various wireless or wired transmission protocols for communication with other devices.

Input buttons/sensors 638 are included to provide an input interface for the user. Any of various kinds of input interfaces may be included, such as buttons, touchpad, joystick, trackball, etc. An ultra-sonic communication module 640 may be included in head-mounted display 650 for facilitating communication with other devices via ultra-sonic technologies.

Bio-sensors 642 are included to enable detection of physiological data from a user. In one embodiment, the bio-sensors 642 include one or more dry electrodes for detecting bio-electric signals of the user through the user's skin.

The foregoing components of head-mounted display 650 have been described as merely exemplary components that may be included in head-mounted display 650. In various embodiments of the disclosure, the head-mounted display 650 may or may not include some of the various aforementioned components. Embodiments of the head-mounted display 650 may additionally include other components not presently described, but known in the art, for purposes of facilitating aspects of the present disclosure as herein described.

It will be appreciated by those skilled in the art that in various embodiments of the disclosure, the aforementioned handheld device may be utilized in conjunction with an interactive application displayed on a display to provide various interactive functions. The exemplary embodiments described herein are provided by way of example only, and not by way of limitation.

Figure 7:
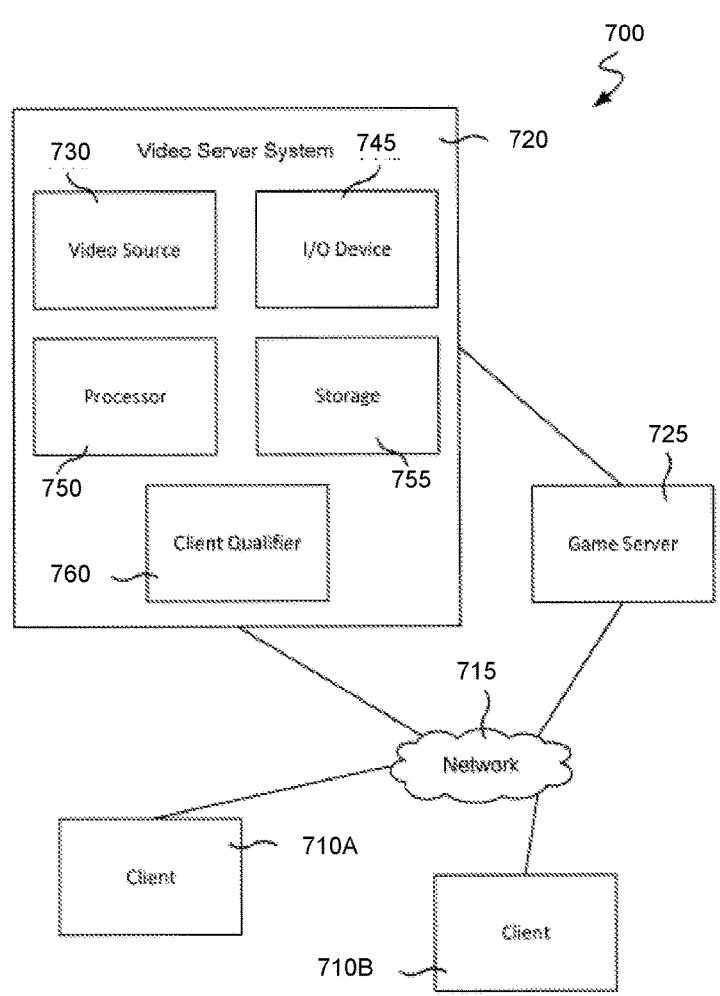
FIG. 7 is a block diagram of a Game System, according to various embodiments of the disclosure. Game System is configured to provide a video stream to one or more Clients via a Network.

FIG. 7 is a block diagram of a Game System 700, according to various embodiments of the disclosure. Game System 700 is configured to provide a video stream to one or more Clients 710 via a Network 715. Game System 700 typically includes a Video Server System 720 and an optional game server 725. Video Server System 720 is configured to provide the video stream to the one or more Clients 710 with a minimal quality of service. For example, Video Server System 720 may receive a game command that changes the state of or a point of view within a video game, and provide Clients 710 with an updated video stream reflecting this change in state with minimal lag time. The Video Server System 720 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 720 frames per second. Although higher or lower frame rates are included in alternative embodiments of the disclosure.

Clients 710, referred to herein individually as 710A., 710B., etc., may include head mounted displays, terminals, personal computers, game consoles, tablet computers, telephones, set top boxes, kiosks, wireless devices, digital pads, stand-alone devices, handheld game playing devices, and/or the like. Typically, Clients 710 are configured to receive encoded video streams (i.e., compressed), decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 710 or on a separate device such as a monitor or television. Clients 710 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 710 are optionally geographically dispersed. The number of clients included in Game System 700 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 720 to deliver a game viewed through the HMD. In one embodiment, the game console receives the video stream from the video server system 720, and the game console forwards the video stream, or updates to the video stream, to the HMD for rendering.

Clients 710 are configured to receive video streams via Network 715. Network 715 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 710 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 710 may, but are not required to, further include systems configured for modifying received video. For example, a client may be configured to perform further rendering, to overlay one video image on another video image, to crop a video image, and/or the like. For example, Clients 710 may be configured to receive various types of video frames, such as I-frames, P-frames and B-frames, and to process these frames into images for display to a user. In some embodiments, a member of Clients 710 is configured to perform further rendering, shading, conversion to 3-D, or like operations on the video stream. A member of Clients 710 is optionally configured to receive more than one audio or video stream. Input devices of Clients 710 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 710 is generated and provided by Video Server System 720. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 710 are typically configured to receive inputs from a user. These inputs may include game commands configured to change the state of the video game or otherwise affect gameplay. The game commands can be received using input devices and/or may be automatically generated by computing instructions executing on Clients 710. The received game commands are communicated from Clients 710 via Network 715 to Video Server System 720 and/or Game Server 725. For example, in some embodiments, the game commands are communicated to Game Server 725 via Video Server System 720. In some embodiments, separate copies of the game commands are communicated from Clients 710 to Game Server 725 and Video Server System 720. The communication of game commands is optionally dependent on the identity of the command Game commands are optionally communicated from Client 710A through a different route or communication channel that that used to provide audio or video streams to Client 710A.

Game Server 725 is optionally operated by a different entity than Video Server System 720. For example, Game Server 725 may be operated by the publisher of a multi-player game. In this example, Video Server System 720 is optionally viewed as a client by Game Server 725 and optionally configured to appear from the point of view of Game Server 725 to be a prior art client executing a prior art game engine. Communication between Video Server System 720 and Game Server 725 optionally occurs via Network 715. As such, Game Server 725 can be a prior art multiplayer game server that sends game state information to multiple clients, one of which is game server system 720. Video Server System 720 may be configured to communicate with multiple instances of Game Server 725 at the same time. For example, Video Server System 720 can be configured to provide a plurality of different video games to different users. Each of these different video games may be supported by a different Game Server 725 and/or published by different entities. In some embodiments, several geographically distributed instances of Video Server System 720 are configured to provide game video to a plurality of different users. Each of these instances of Video Server System 720 may be in communication with the same instance of Game Server 725. Communication between Video Server System 720 and one or more Game Server 725 optionally occurs via a dedicated communication channel For example, Video Server System 720 may be connected to Game Server 725 via a high bandwidth channel that is dedicated to communication between these two systems.

Video Server System 720 comprises at least a Video Source 730, an I/O Device 745, a Processor 750, and non-transitory Storage 755. Video Server System 720 may include one computing device or be distributed among a plurality of computing devices. These computing devices are optionally connected via a communications system such as a local area network.

Video Source 730 is configured to provide a video stream, e.g., streaming video or a series of video frames that form a moving picture. In some embodiments, Video Source 730 includes a video game engine and rendering logic. The video game engine is configured to receive game commands from a player and to maintain a copy of the state of the video game based on the received commands This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 725. Game Server 725 may maintain a copy of the state of the game based on game commands received from multiple players using geographically disperse clients. In these cases, the game state is provided by Game Server 725 to Video Source 730, wherein a copy of the game state is stored and rendering is performed. Game Server 725 may receive game commands directly from Clients 710 via Network 715, and/or may receive game commands via Video Server System 720.

Video Source 730 typically includes rendering logic, e.g., hardware, firmware, and/or software stored on a computer readable medium such as Storage 755. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 710. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 730 includes a video recording device such as a camera. This camera may be used to generate delayed or live video that can be included in the video stream of a computer game. The resulting video stream optionally includes both rendered images and images recorded using a still or video camera. Video Source 730 may also include storage devices configured to store previously recorded video to be included in a video stream. Video Source 730 may also include motion or positioning sensing devices configured to detect motion or position of an object, e.g., person, and logic configured to determine a game state or produce video-based on the detected motion and/or position.

Video Source 730 is optionally configured to provide overlays configured to be placed on other video. For example, these overlays may include a command interface, log in instructions, messages to a game player, images of other game players, video feeds of other game players (e.g., webcam video). In embodiments of Client 710A including a touch screen interface or a gaze detection interface, the overlay may include a virtual keyboard, joystick, touch pad, and/or the like. In one example of an overlay a player's voice is overlaid on an audio stream. Video Source 730 optionally further includes one or more audio sources.

In embodiments wherein Video Server System 720 is configured to maintain the game state based on input from more than one player, each player may have a different point of view comprising a position and direction of view. Video Source 730 is optionally configured to provide a separate video stream for each player based on their point of view. Further, Video Source 730 may be configured to provide a different frame size, frame data size, and/or encoding to each of Client 710. Video Source 730 is optionally configured to provide 3-D video.

I/O Device 745 is configured for Video Server System 720 to send and/or receive information such as video, commands, requests for information, a game state, gaze information, device motion, device location, user motion, client identities, player identities, game commands, security information, audio, and/or the like. I/O Device 745 typically includes communication hardware such as a network card or modem. I/O Device 745 is configured to communicate with Game Server 725, Network 715, and/or Clients 710.

Processor 750 is configured to execute logic, e.g. software, included within the various components of Video Server System 720 discussed herein. For example, Processor 750 may be programmed with software instructions in order to perform the functions of Video Source 730, Game Server 725, and/or a Client Qualifier 760. Video Server System 720 optionally includes more than one instance of Processor 750. Processor 750 may also be programmed with software instructions in order to execute commands received by Video Server System 720, or to coordinate the operation of the various elements of Game System 700 discussed herein. Processor 750 may include one or more hardware device. Processor 750 is an electronic processor.

Storage 755 includes non-transitory analog and/or digital storage devices. For example, Storage 755 may include an analog storage device configured to store video frames. Storage 755 may include a computer readable digital storage, e.g. a hard drive, an optical drive, or solid state storage. Storage 715 is configured (e.g. by way of an appropriate data structure or file system) to store video frames, artificial frames, a video stream including both video frames and artificial frames, audio frame, an audio stream, and/or the like. Storage 755 is optionally distributed among a plurality of devices. In some embodiments, Storage 755 is configured to store the software components of Video Source 730 discussed elsewhere herein. These components may be stored in a format ready to be provisioned when needed.

Video Server System 720 optionally further comprises Client Qualifier 760. Client Qualifier 760 is configured for remotely determining the capabilities of a client, such as Clients 710A or 710B. These capabilities can include both the capabilities of Client 710A itself as well as the capabilities of one or more communication channels between Client 710A and Video Server System 720. For example, Client Qualifier 760 may be configured to test a communication channel through Network 715.

Client Qualifier 760 can determine (e.g., discover) the capabilities of Client 710A manually or automatically. Manual determination includes communicating with a user of Client 710A and asking the user to provide capabilities. For example, in some embodiments, Client Qualifier 760 is configured to display images, text, and/or the like within a browser of Client 710A. In one embodiment, Client 710A is an HMD that includes a browser. In another embodiment, client 710A is a game console having a browser, which may be displayed on the HMD. The displayed objects request that the user enter information such as operating system, processor, video decoder type, type of network connection, display resolution, etc. of Client 710A. The information entered by the user is communicated back to Client Qualifier 760.

Automatic determination may occur, for example, by execution of an agent on Client 710A and/or by sending test video to Client 710A. The agent may comprise computing instructions, such as java script, embedded in a web page or installed as an add-on. The agent is optionally provided by Client Qualifier 760. In various embodiments, the agent can find out processing power of Client 710A, decoding and display capabilities of Client 710A, lag time reliability and bandwidth of communication channels between Client 710A and Video Server System 720, a display type of Client 710A, firewalls present on Client 710A, hardware of Client 710A, software executing on Client 710A, registry entries within Client 710A, and/or the like.

Client Qualifier 760 includes hardware, firmware, and/or software stored on a computer readable medium. Client Qualifier 760 is optionally disposed on a computing device separate from one or more other elements of Video Server System 720. For example, in some embodiments, Client Qualifier 760 is configured to determine the characteristics of communication channels between Clients 710 and more than one instance of Video Server System 720. In these embodiments the information discovered by Client Qualifier can be used to determine which instance of Video Server System 720 is best suited for delivery of streaming video to one of Clients 710.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method, comprising:
    establishing at a game server a multi-player gaming session of a gaming application, wherein a first client device of a first player and a second client device of a second player are communicatively coupled to the game server via a network to enable participation in the multi-player gaming session;
    monitoring at the game server a first game play of the first player and a second game play of the second player in the multi-player gaming session of the gaming application to determine a current game context using a first artificial intelligence (AI) model configured to learn a plurality of game contexts of the of the gaming application;
    executing the first AI model to identify a plurality of tasks potentially presented in the multi-player gaming session based on the current game context, wherein the plurality of tasks correspond with a plurality of task types;
    dynamically determining at the game server during the multi-player gaming session a plurality of player proficiency scores for the first player and the second player in association with the plurality of tasks types based on first data collected by the game server from a first plurality of game plays of a first plurality of gaming applications by the first player and second data collected by the game server from a second plurality of game plays by a second plurality of gaming applications of the second player, wherein the first plurality of game plays includes the first game play of the first player and the second plurality of game plays includes the second game play of the second player;

executing a second AI model configured to predict rates of success when accomplishing tasks encountered in the gaming application to determine at the game server during the multi-player gaming session a plurality of predictive rates of success for different combinations of task pairs from the plurality of tasks that could be performed by the first player and the second player based on the plurality of player proficiency scores;

assigning at the game server during the multi-player gaming session a first task of a first task type to the first player and a second task of a second task type to the second player that has the maximum predictive rate of success from the plurality of predictive rates of success, wherein the plurality of tasks include the first task and the second task;

sending a first notification over the network to the first client device that the first task to be performed in the multi-player gaming session is assigned to the first player; and sending a second notification over the network to the second client device that the second task to be performed in the multi-player gaming session is assigned to the second player, wherein the game server is configured to control the multi-player gaming session.

2. The method of claim 1, further comprising:
determining a first player proficiency score for the first player in association with the first task type;
determining a second player proficiency score for the second player in association with the second task type; and
determining a predictive rate of success for accomplishing the first task by the first player and the second task by the second player based on the first player proficiency score for the first player and the second player proficiency score for the second player.

3. The method of claim 1, further comprising:
determining a first corresponding task type and a second corresponding task type for each of the different combinations of task pairs;
determining a first corresponding player proficiency score for the first corresponding task type for the first player;
determining a second corresponding player proficiency score for the second corresponding task type for the second player; and
determining a predictive rate of success for accomplishing tasks in the each of the different combinations of task pairs based on the first corresponding player proficiency score and the second corresponding player proficiency score.

4. The method of claim 2,
wherein the first player proficiency score is based on current and past performances of the first player when encountering the first plurality of tasks of the first task type.

5. The method of claim 1, further comprising:
assigning a plurality of tasks of a plurality of task types between the first player and the second player to maximize a combined predictive rate of success for accomplishing the plurality of tasks,
wherein the first player and the second player work cooperatively to accomplish the plurality of tasks.

6. The method of claim 1, further comprising:
determining a first player proficiency score for the first player in accomplishing the first task;
determining a first predictive rate of success in accomplishing the first task based on the first player proficiency score; and
determining a recommendation for the first player in association with accomplishing the first task based on the first player proficiency score.

7. The method of claim 1, further comprising:
determining a first player proficiency score for the first player in association with accomplishing tasks of a first task type encountered in the gaming application.

8. A non-transitory computer-readable medium storing a computer program for performing a method, the non-transitory computer-readable medium comprising:
program instructions for establishing at a game server a multi-player gaming session of a gaming application, wherein a first client device of a first player and a second client device of a second player are communicatively coupled to the game server via a network to enable participation in the multi-player gaming session;
program instructions for monitoring at the game server a first game play of the first player and a second game play of the second player in the multi-player gaming session of the gaming application to determine a current game context using a first artificial intelligence (AI) model configured to learn a plurality of game contexts of the of the gaming application;
program instructions for executing the first AI model to identify a plurality of tasks potentially presented in the multi-player gaming session based on the current game context, wherein the plurality of tasks correspond with a plurality of task types;
program instructions for dynamically determining at the game server during the multi-player gaming session a plurality of player proficiency scores for the first player and the second player in association with the plurality of tasks types based on first data collected by the game server from a first plurality of game plays of a first plurality of gaming applications by the first player and second data collected by the game server from a second plurality of game plays by a second plurality of gaming applications of the second player, wherein the first plurality of game plays includes the first game play of the first player and the second plurality of game plays includes the second game play of the second player;
program instructions for executing a second AI model configured to predict rates of success when accomplishing tasks encountered in the gaming application to determine at the game server during the multi-player gaming session a plurality of predictive rates of success for different combinations of task pairs from the plurality of tasks that could be performed by the first player and the second player based on the plurality of player proficiency scores;
program instructions for assigning at the game server during the multi-player gaming session a first task of a first task type to the first player and a second task of a second task type to the second player that has the maximum predictive rate of success from the plurality of predictive rates of success, wherein the plurality of tasks include the first task and the second task;
program instructions for sending a first notification over the network to the first client device that the first task to be performed in the multi-player gaming session is assigned to the first player; and program instructions for sending a second notification over the network to the second client device that the second task to be performed in the multi-player gaming session is assigned to the second player, wherein the game server is configured to control the multi-player gaming session.

9. The non-transitory computer-readable medium of claim 8, further comprising:

program instructions for determining a first player proficiency score for the first player in association with the first task type;

program instructions for determining a second player proficiency score for the second player in association with the second task type; and program instructions for determining a predictive rate of success for accomplishing the first task by the first player and the second task by the second player based on the first player proficiency score for the first player and the second player proficiency score for the second player.

10. The non-transitory computer-readable medium of claim 8, further comprising:

program instructions for determining a first corresponding task type and a second corresponding task type for each of the different combinations of task pairs;

program instructions for determining a first corresponding player proficiency score for the first corresponding task type for the first player;

program instructions for determining a second corresponding player proficiency score for the second corresponding task type for the second player; and program instructions for determining a predictive rate of success for accomplishing tasks in the each of the different combinations of task pairs based on the first corresponding player proficiency score and the second corresponding player proficiency score.

11. The non-transitory computer-readable medium of claim 9, wherein in the method the first player proficiency score is based on current and past performances of the first player when encountering the first plurality of tasks of the first task type.

12. The non-transitory computer-readable medium of claim 8, further comprising:

program instructions for assigning a plurality of tasks of a plurality of task types between the first player and the second player to maximize a combined predictive rate of success for accomplishing the plurality of tasks, wherein the first player and the second player work cooperatively to accomplish the plurality of tasks.

13. The non-transitory computer-readable medium of claim 8, further comprising:

program instructions for determining a first player proficiency score for the first player in accomplishing the first task;

program instructions for determining a first predictive rate of success in accomplishing the first task based on the first player proficiency score; and program instructions for determining a recommendation for the first player in association with accomplishing the first task based on the first player proficiency score.

14. The non-transitory computer-readable medium of claim 8, further comprising:

program instructions for determining a first player proficiency score for the first player in association with accomplishing tasks of a first task type encountered in the gaming application.

15. A computer system comprising:

a processor; and memory coupled to the processor and having stored therein instructions that, if executed by the computer system, cause the computer system to execute a method comprising:

establishing at a game server a multi-player gaming session of a gaming application, wherein a first client device of a first player and a second client device of a second player are communicatively coupled to the game server via a network to enable participation in the multi-player gaming session;

monitoring at the game server a first game play of the first player and a second game play of the second player in the multi-player gaming session of the gaming application to determine a current game context using a first artificial intelligence (AI) model configured to learn a plurality of game contexts of the of the gaming application;

executing the first AI model to identify a plurality of tasks potentially presented in the multi-player gaming session based on the current game context, wherein the plurality of tasks correspond with a plurality of task types;

dynamically determining at the game server during the multi-player gaming session a plurality of player proficiency scores for the first player and the second player in association with the plurality of tasks types based on first data collected by the game server from a first plurality of game plays of a first plurality of gaming applications by the first player and second data collected by the game server from a second plurality of game plays by a second plurality of gaming applications of the second player, wherein the first plurality of game plays includes the first game play of the first player and the second plurality of game plays includes the second game play of the second player;

executing a second AI model configured to predict rates of success when accomplishing tasks encountered in the gaming application to determine at the game server during the multi-player gaming session a plurality of predictive rates of success for different combinations of task pairs from the plurality of tasks that could be performed by the first player and the second player based on the plurality of player proficiency scores;

assigning at the game server during the multi-player gaming session a first task of a first task type to the first player and a second task of a second task type to the second player that has the maximum predictive rate of success from the plurality of predictive rates of success, wherein the plurality of tasks include the first task and the second task;

sending a first notification over the network to the first client device that the first task to be performed in the multi-player gaming session is assigned to the first player; and sending a second notification over the network to the second client device that the second task to be performed in the multi-player gaming session is assigned to the second player, wherein the game server is configured to control the multi-player gaming session.

16. The computer system of claim 15, the method further comprising:
   determining a first player proficiency score for the first player in association with the first task type;
   determining a second player proficiency score for the second player in association with the second task type; and
   determining a predictive rate of success for accomplishing the first task by the first player and the second task by the second player based on the first player proficiency score for the first player and the second player proficiency score for the second player.

17. The computer system of claim 15, the method further comprising:
   determining a first corresponding task type and a second corresponding task type for each of the different combinations of task pairs;
   determining a first corresponding player proficiency score for the first corresponding task type for the first player;
   determining a second corresponding player proficiency score for the second corresponding task type for the second player; and
   determining a predictive rate of success for accomplishing tasks in the each of the different combinations of task pairs based on the first corresponding player proficiency score and the second corresponding player proficiency score.

18. The computer system of claim 15, the method further comprising:
   assigning a plurality of tasks of a plurality of task types between the first player and the second player to maximize a combined predictive rate of success for accomplishing the plurality of tasks,
   wherein the first player and the second player work cooperatively to accomplish the plurality of tasks.

19. The computer system of claim 15, the method further comprising:
   determining a first player proficiency score for the first player in accomplishing the first task;
   determining a first predictive rate of success in accomplishing the first task based on the first player proficiency score; and
   determining a recommendation for the first player in association with accomplishing the first task based on the first player proficiency score.

20. The computer system of claim 15, the method further comprising:
   determining a first player proficiency score for the first player in association with accomplishing tasks of a first task type encountered in the gaming application.

* * * * *